(12) United States Patent
Kim et al.

(10) Patent No.: US 11,422,365 B2
(45) Date of Patent: Aug. 23, 2022

(54) HEAD UP DISPLAY FOR VEHICLE

(71) Applicant: LG ELECTRONICS INC., Seoul (KR)

(72) Inventors: Youngjin Kim, Seoul (KR); Juhyeok Ryu, Seoul (KR); Dongwook Kim, Seoul (KR); Sangok Yeo, Seoul (KR); Kyoungil Lee, Seoul (KR); Seunggyu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 389 days.

(21) Appl. No.: 16/487,701

(22) PCT Filed: Feb. 23, 2018

(86) PCT No.: PCT/KR2018/002274
§ 371 (c)(1),
(2) Date: Aug. 21, 2019

(87) PCT Pub. No.: WO2018/155958
PCT Pub. Date: Aug. 30, 2018

(65) Prior Publication Data
US 2020/0012099 A1  Jan. 9, 2020

(30) Foreign Application Priority Data

Feb. 23, 2017 (KR) .......................... 10-2017-0024204
Feb. 23, 2017 (KR) .......................... 10-2017-0024207

(51) Int. Cl.
*G02B 27/01* (2006.01)
*G02B 27/28* (2006.01)
(Continued)

(52) U.S. Cl.
CPC .......... *G02B 27/0101* (2013.01); *B60K 35/00* (2013.01); *G02B 5/3083* (2013.01);
(Continued)

(58) Field of Classification Search
CPC .... G02B 2027/0169; G02B 2027/0174; G02B 21/0004; G02B 21/0008; G02B 21/0032;
(Continued)

(56) References Cited

U.S. PATENT DOCUMENTS

2018/0157036 A1* 6/2018 Choi ..................... G06T 19/006
2019/0162960 A1* 5/2019 Harada ................ G02B 6/0008
2019/0346713 A1* 11/2019 Miyake ............ G02F 1/133382

FOREIGN PATENT DOCUMENTS

JP       2002-303822 A    10/2002
JP       2006-91489 A      4/2006
(Continued)

*Primary Examiner* — Collin X Beatty
*Assistant Examiner* — Grant A Gagnon
(74) *Attorney, Agent, or Firm* — Birch, Stewart, Kolasch & Birch, LLP

(57) ABSTRACT

Provided is a head up display for a vehicle. The head up display for the vehicle may include an imaging mechanism for emitting a linearly-polarized light in a first direction and a linearly-polarized light in a second direction orthogonal to the first direction, a first reflection mirror for reflecting a light to a windshield of the vehicle, a polarization reflection mirror spaced apart from the first reflection mirror wherein the polarization reflection mirror transmits the linearly-polarized light in the first direction and reflects the linearly-polarized light in the second direction, and a second reflection mirror spaced apart from the polarization reflection mirror wherein the second reflection mirror reflects the light transmitted through the polarization reflection mirror to the polarization reflection mirror. The imaging mechanism may include a separating partition for preventing mutual interference between the linearly-polarized light in the first direction and the linearly-polarized light in the second direction.

11 Claims, 19 Drawing Sheets

(51) Int. Cl.
  *G02B 5/30* (2006.01)
  *B60K 35/00* (2006.01)
(52) U.S. Cl.
  CPC ....... *G02B 27/0149* (2013.01); *G02B 27/283* (2013.01); *B60K 2370/1529* (2019.05); *B60K 2370/23* (2019.05); *B60K 2370/60* (2019.05); *G02B 2027/015* (2013.01)
(58) Field of Classification Search
  CPC .. G02B 21/008; G02B 21/0092; G02B 21/06; G02B 21/16; G02B 21/18; G02B 21/24; G02B 2207/121; G02B 2207/123; G02B 23/04; G02B 23/08; G02B 23/105; G02B 25/002; G02B 26/001; G02B 26/08; G02B 26/085; G02B 26/0858; G02B 26/0875; G02B 26/0883; G02B 27/0025; G02B 27/0037; G02B 27/0043; G02B 27/0103; G02B 27/0149; G02B 27/0176; G02B 27/022; G02B 27/026; G02B 27/04; G02B 27/0966; G02B 27/106; G02B 27/1093; G02B 27/12; G02B 27/141; G02B 27/147; G02B 27/30; G02B 27/40; G02B 27/4211; G02B 27/4222; G02B 27/4233; G02B 27/4238; G02B 27/4255; G02B 7/52; G02B 27/62; G02B 3/0012; G02B 3/0037; G02B 30/24; G02B 30/26; G02B 30/28; G02B 30/29; G02B 5/00; G02B 5/0231; G02B 5/0236; G02B 5/0289; G02B 5/0808; G02B 5/09; G02B 5/1842; G02B 5/1852; G02B 5/223; G02B 5/281; G02B 5/282; G02B 6/0001; G02B 6/0008; G02B 6/0021; G02B 6/0068; G02B 6/0073; G02B 6/0076; G02B 6/0083; G02B 6/0085; G02B 6/02085; G02B 6/10; G02B 6/12; G02B 6/1226; G02B 6/13; G02B 6/2706; G02B 6/278; G02B 6/2817; G02B 6/29313; G02B 6/29314; G02B 6/29317; G02B 6/29338; G02B 6/29343; G02B 6/2935; G02B 6/29367; G02B 6/29373; G02B 6/29382; G02B 6/29385; G02B 6/29392; G02B 6/35; G02B 6/3512; G02B 6/3514; G02B 6/3522; G02B 6/3548; G02B 6/3552; G02B 6/3556; G02B 6/3652; G02B 6/3676; G02B 6/3822; G02B 6/42; G02B 6/4209; G02B 6/4218; G02B 7/00; G02B 7/002; G02B 7/003; G02B 7/006; G02B 7/02; G02B 7/12; G02B 7/32; B60K 2370/1529
  USPC ........................................................ 359/485
  See application file for complete search history.

(56) References Cited

FOREIGN PATENT DOCUMENTS

| | | |
|---|---|---|
| JP | 2017-9666 A | 1/2017 |
| KR | 10-2015-0101153 A | 9/2015 |
| KR | 10-2016-0055623 A | 5/2016 |

* cited by examiner

[FIG. 1]
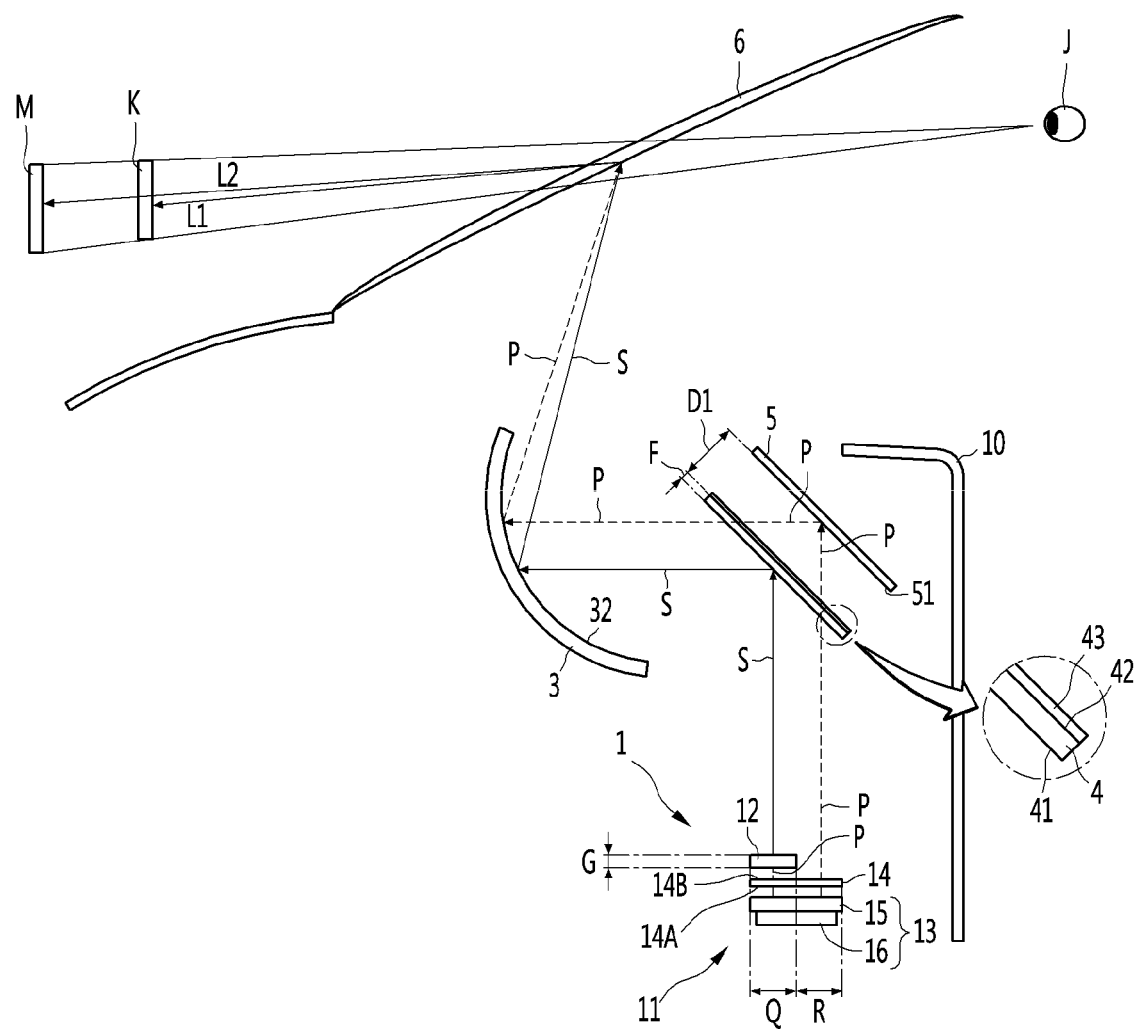

[FIG. 2]
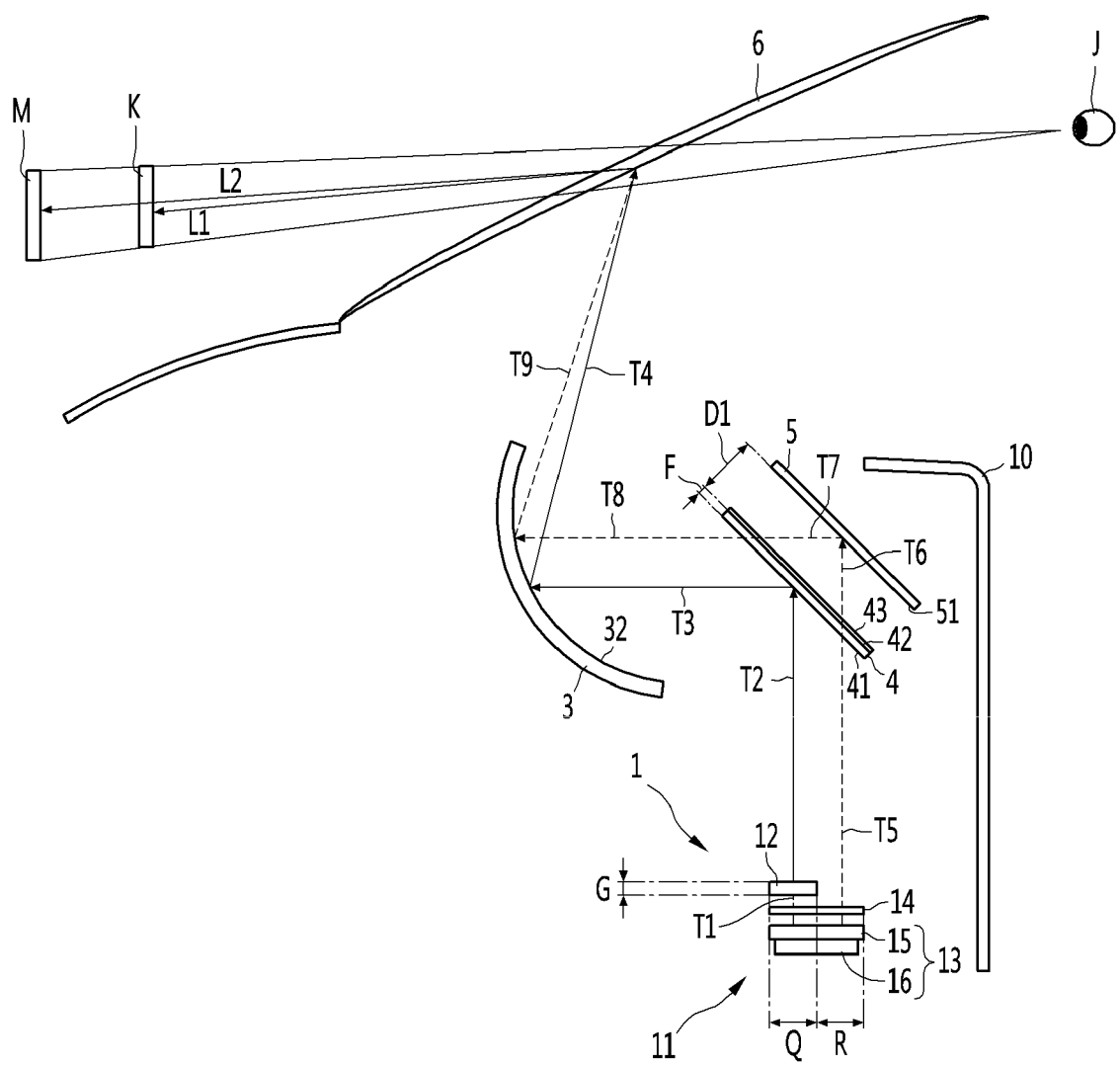

[FIG. 3]
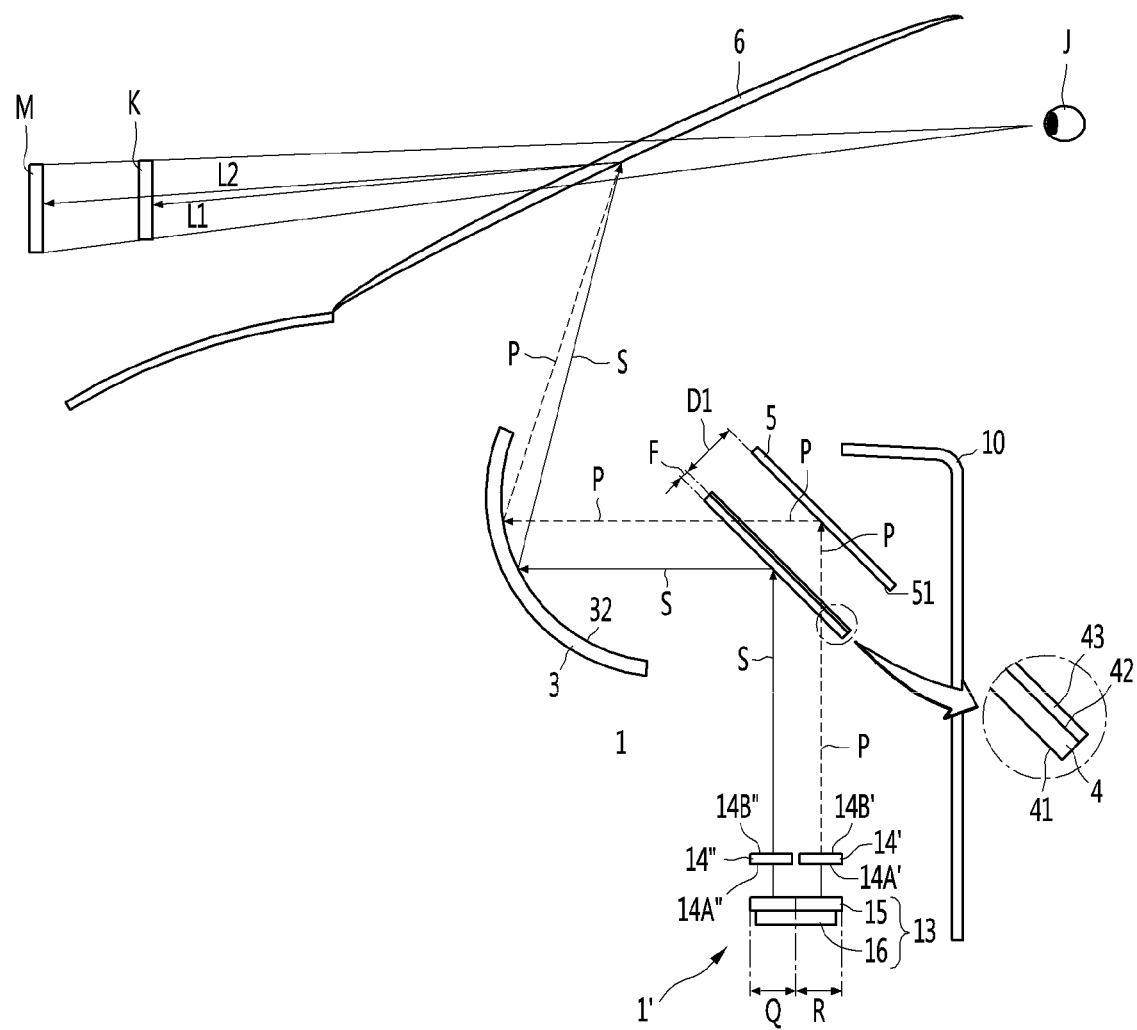

[FIG. 4]
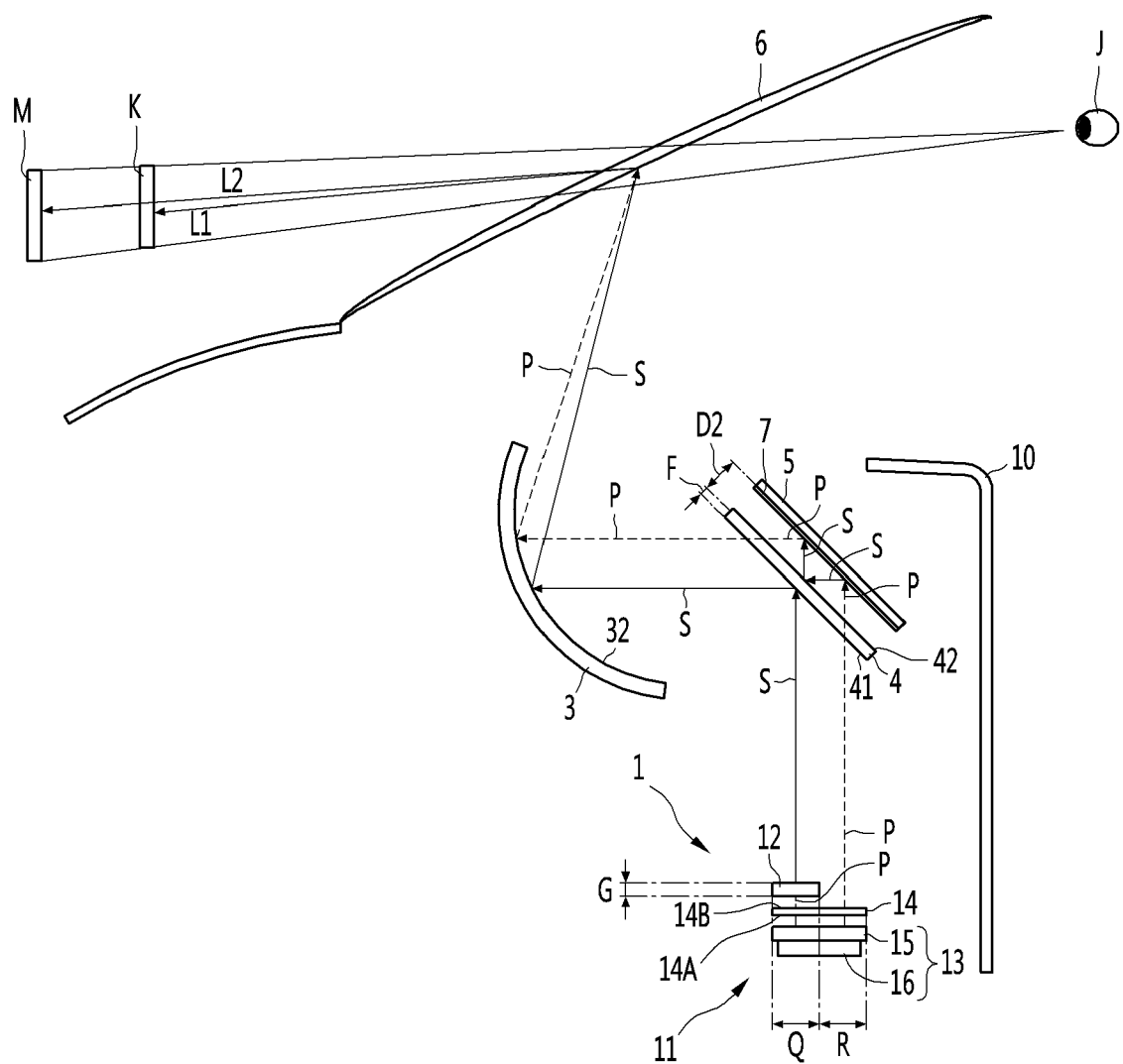

[FIG. 5]
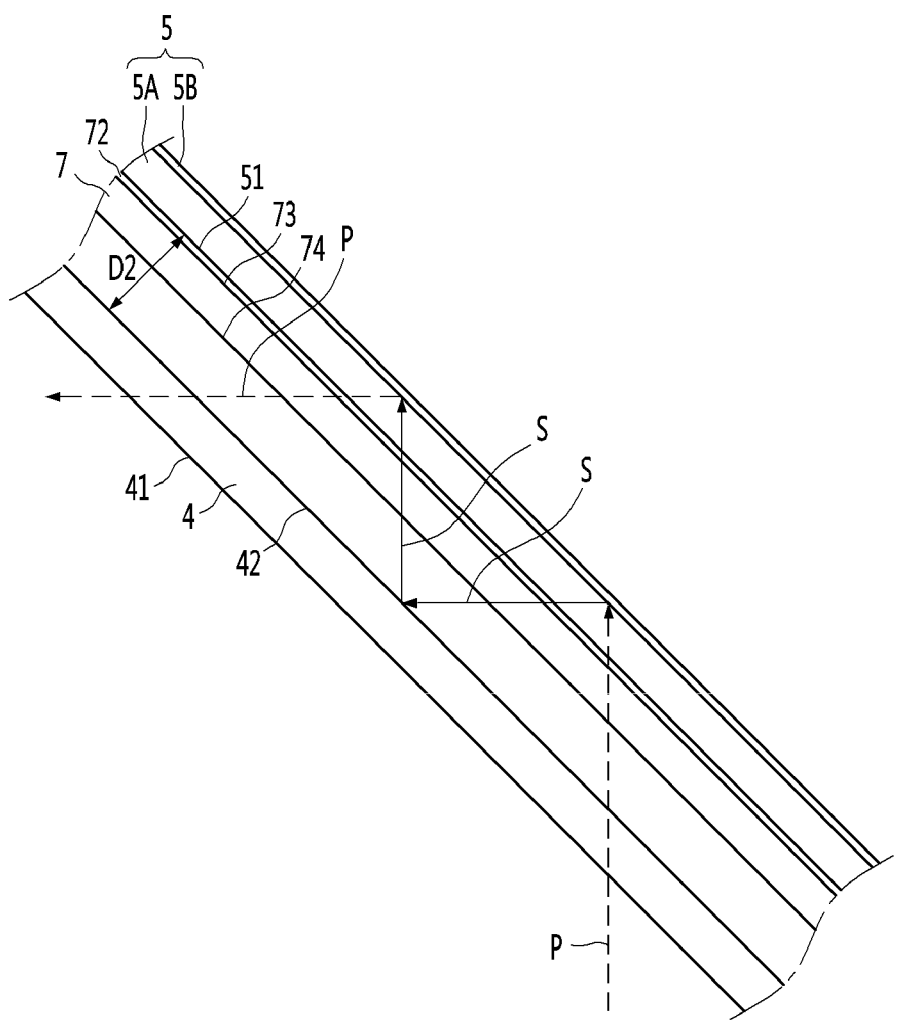

[FIG. 6]
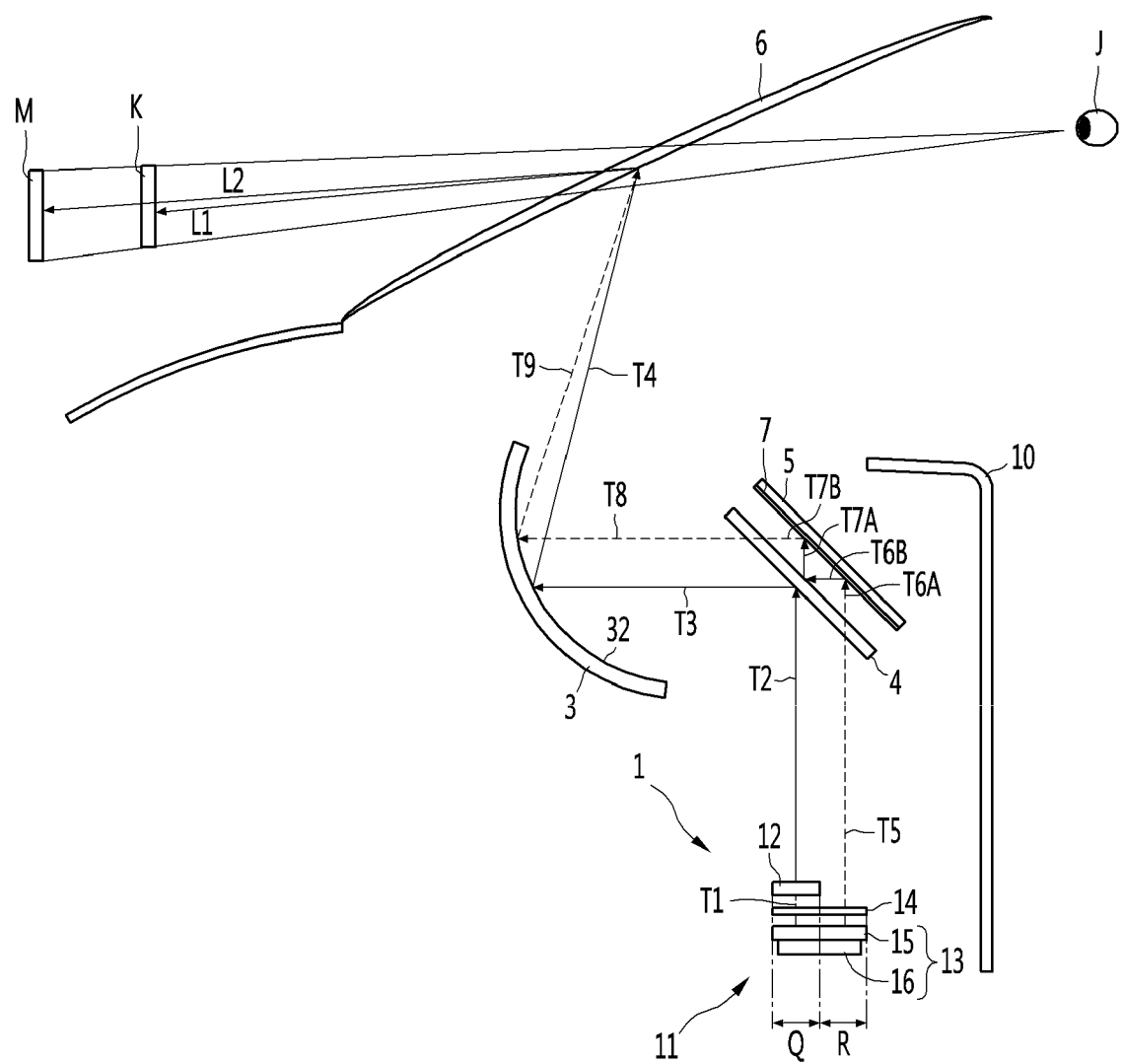

[FIG. 7]
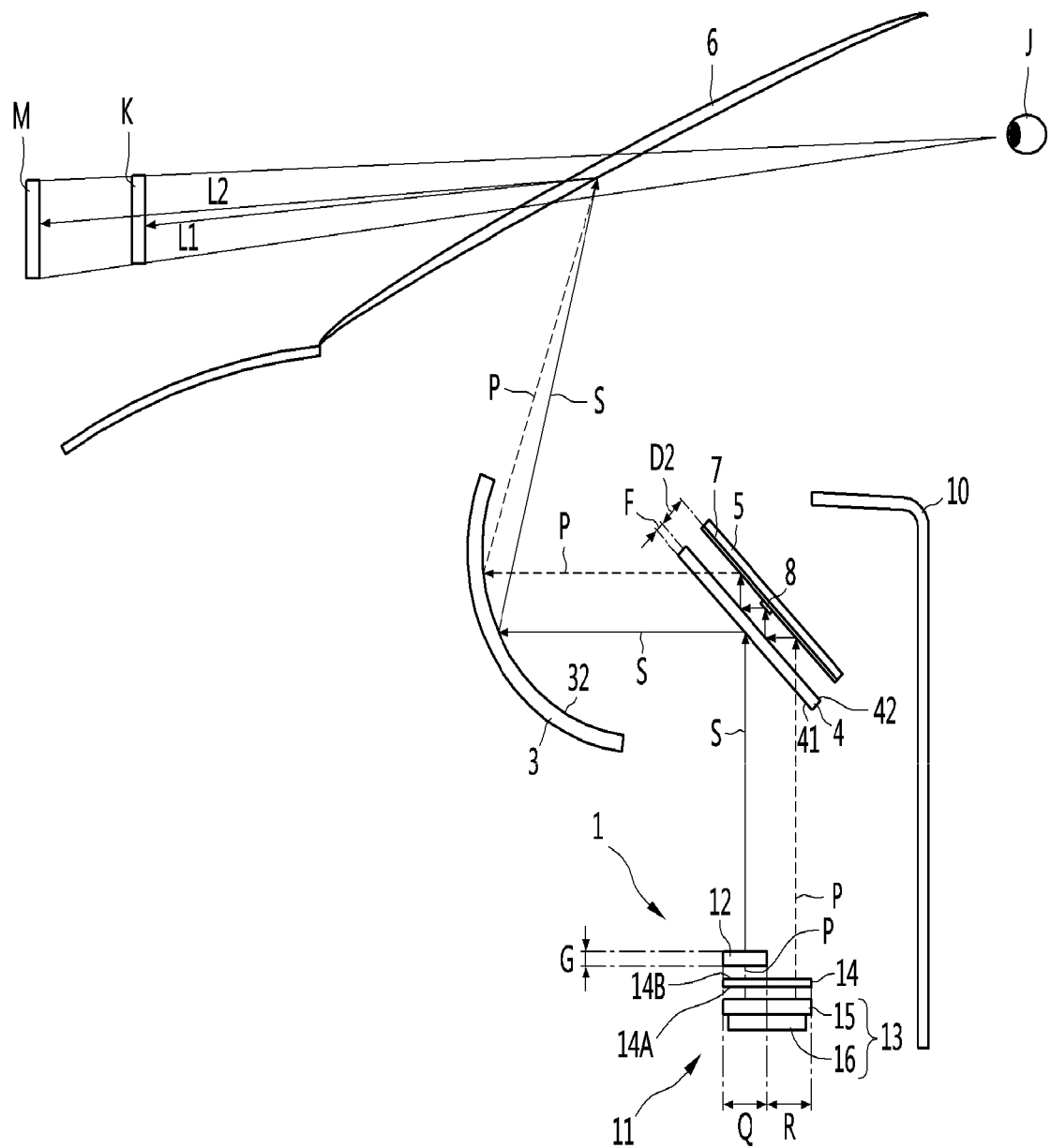

[FIG. 8]
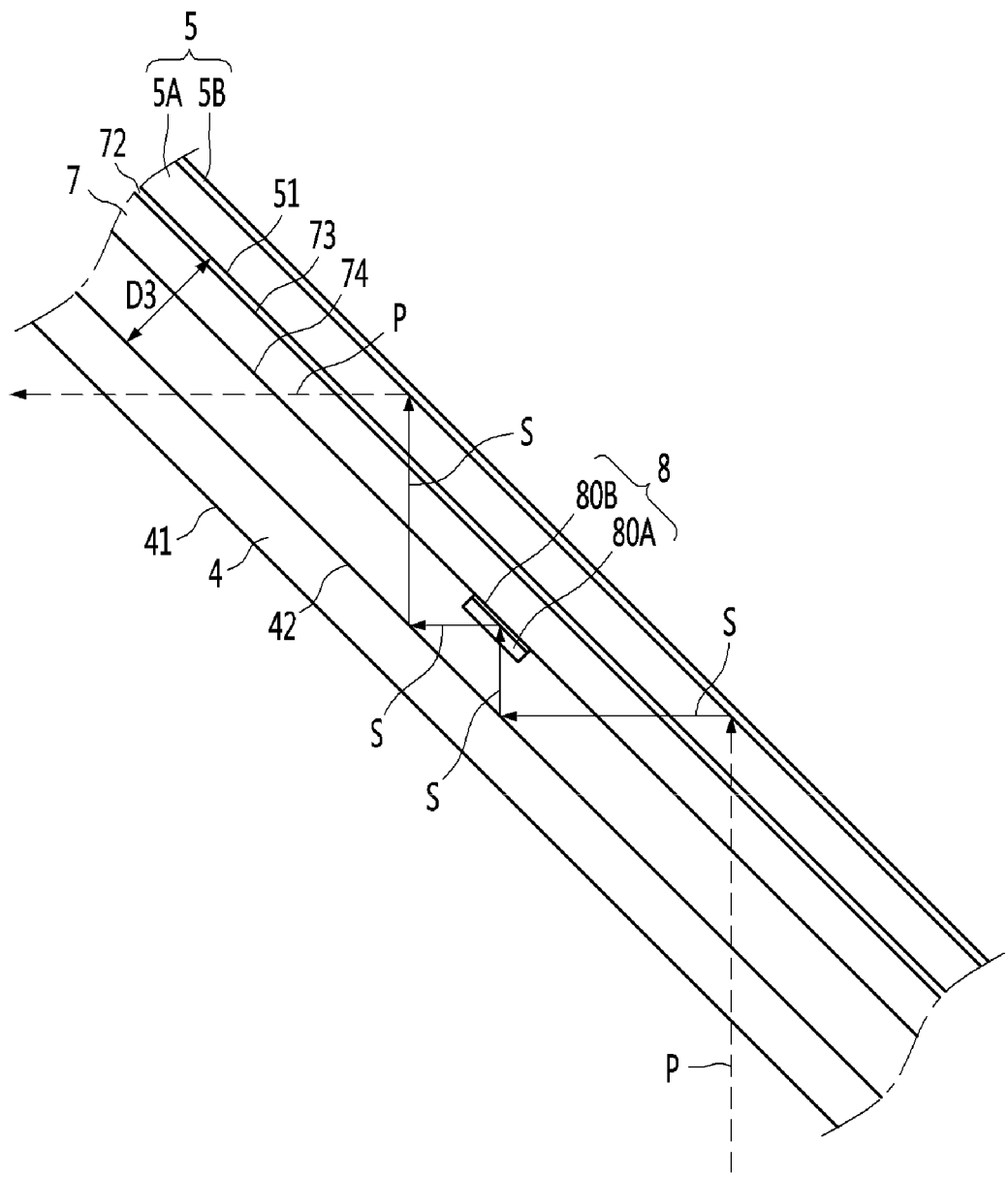

[FIG. 9]
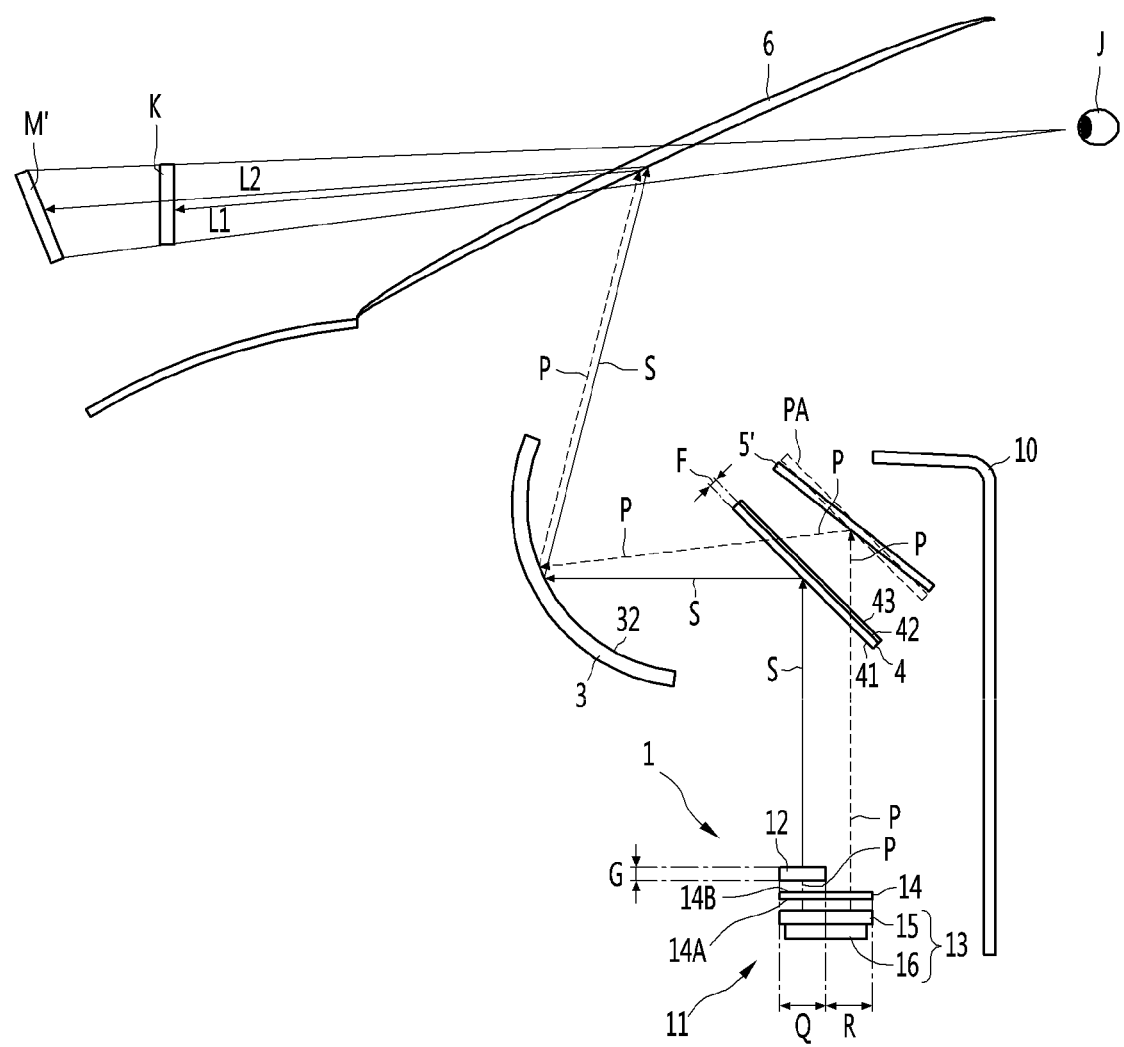

[FIG. 10]
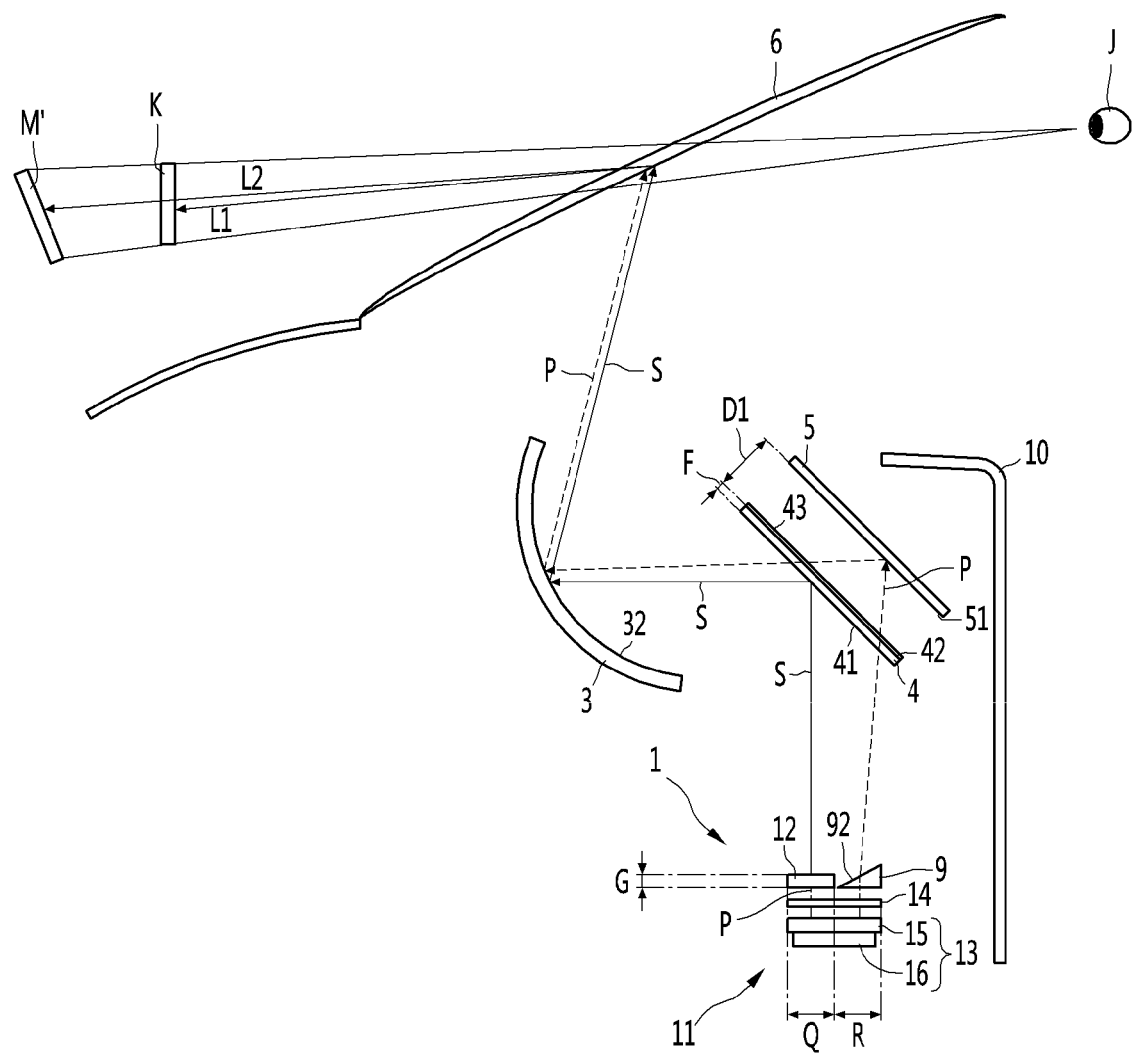

[FIG. 11]
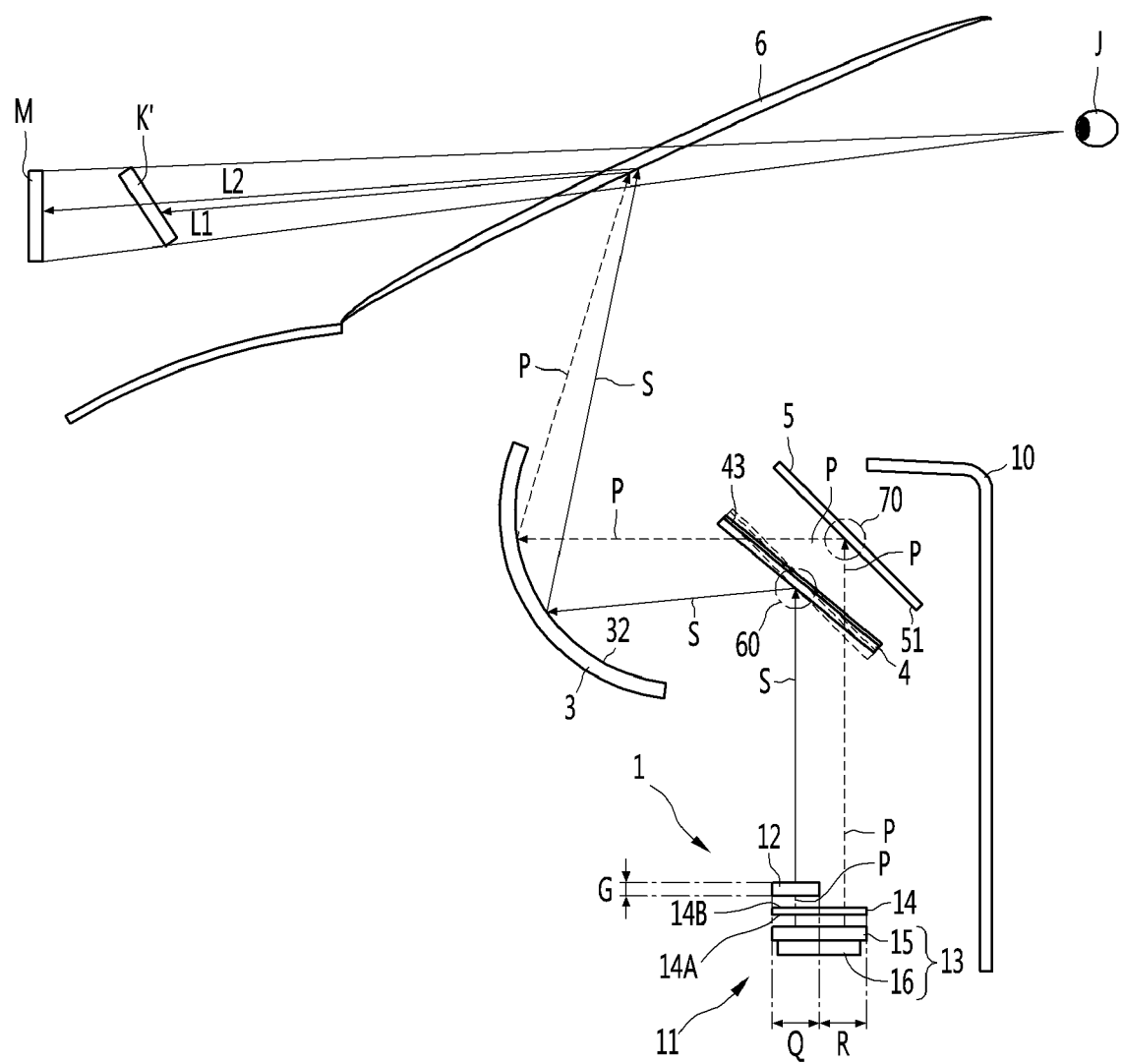

[FIG. 12]
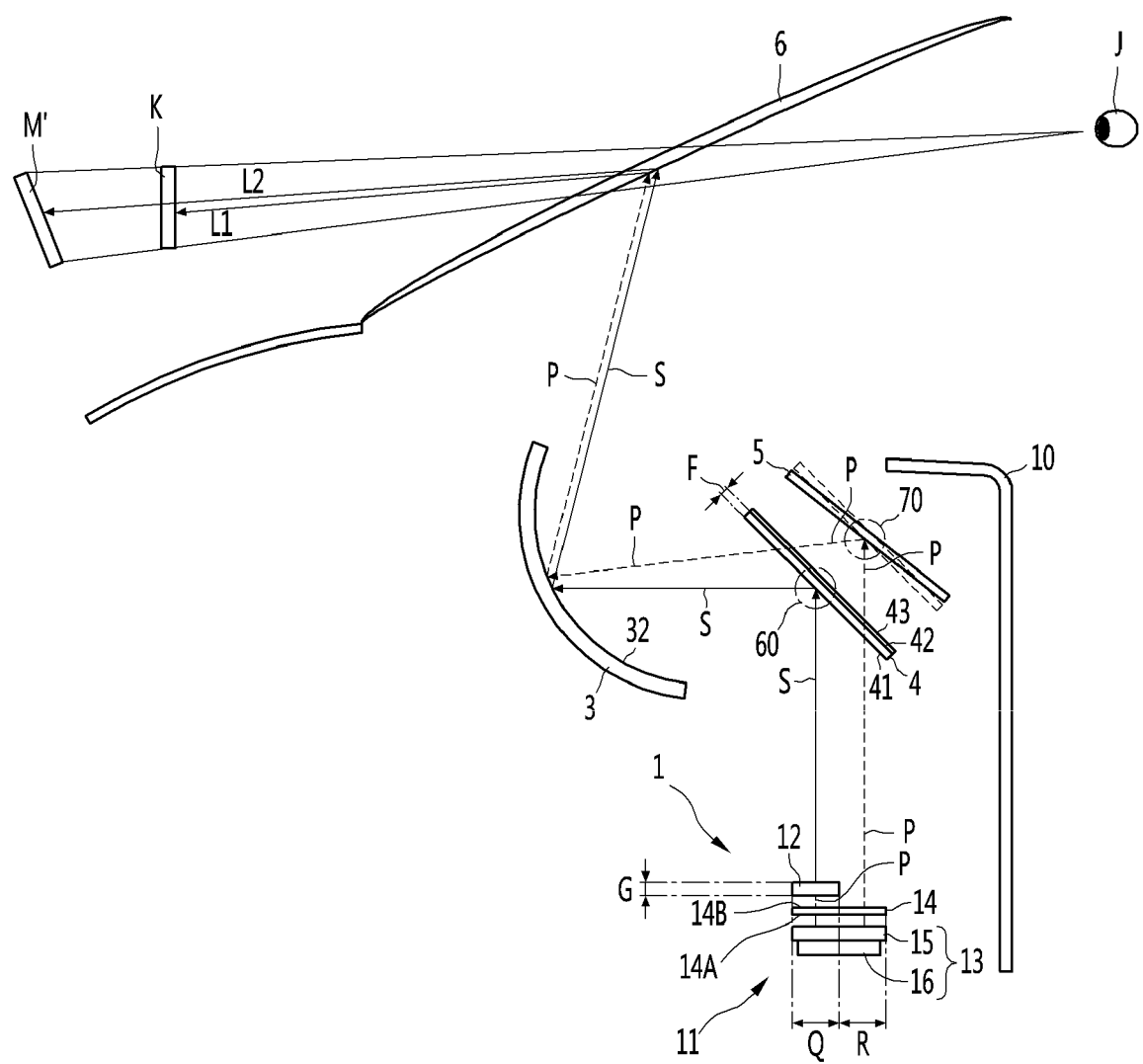

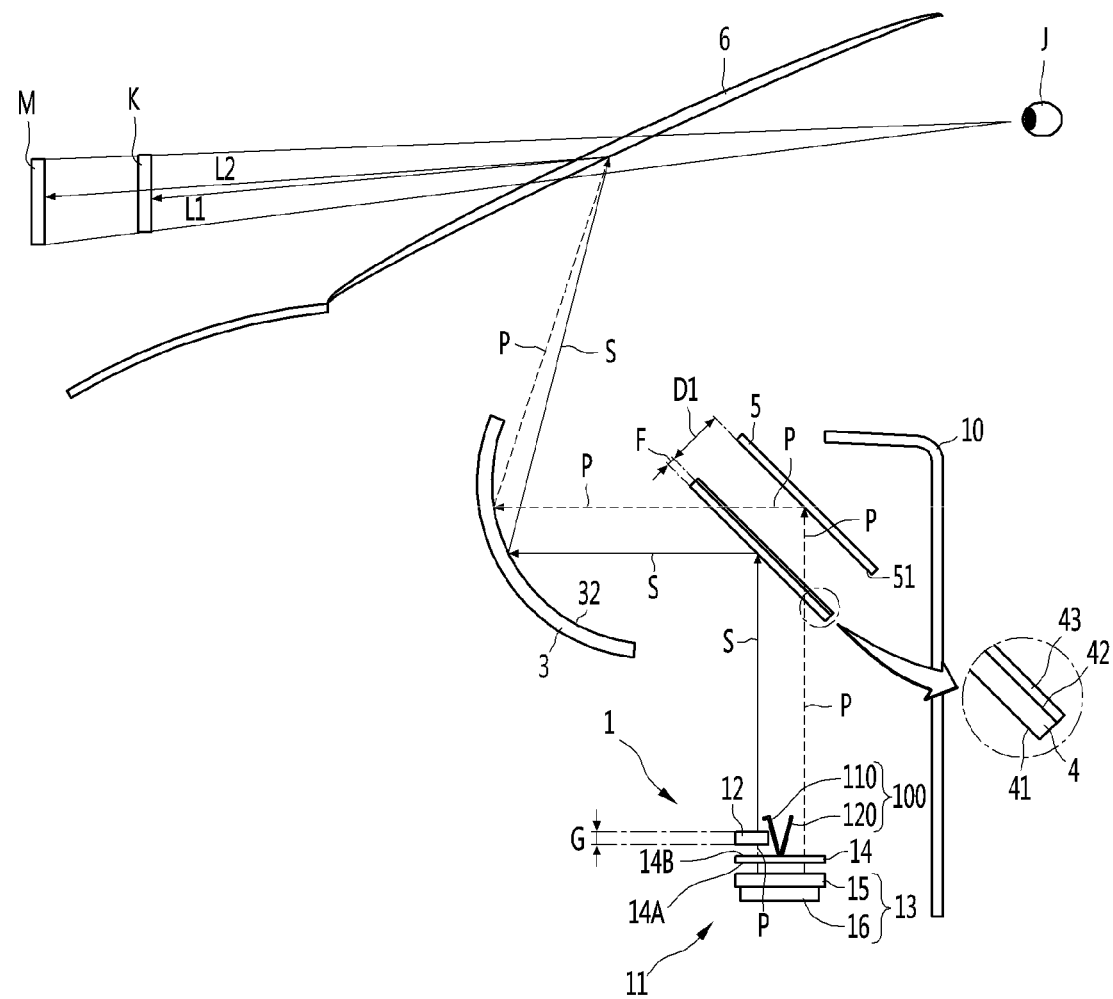
[FIG. 13]

[FIG. 14]
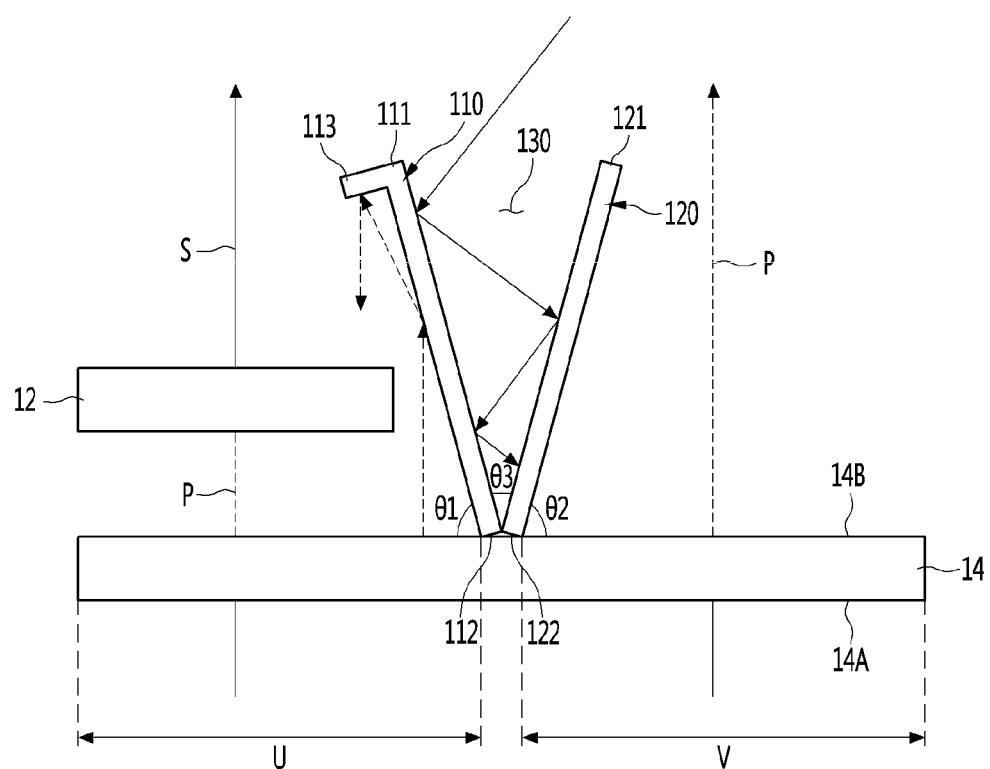

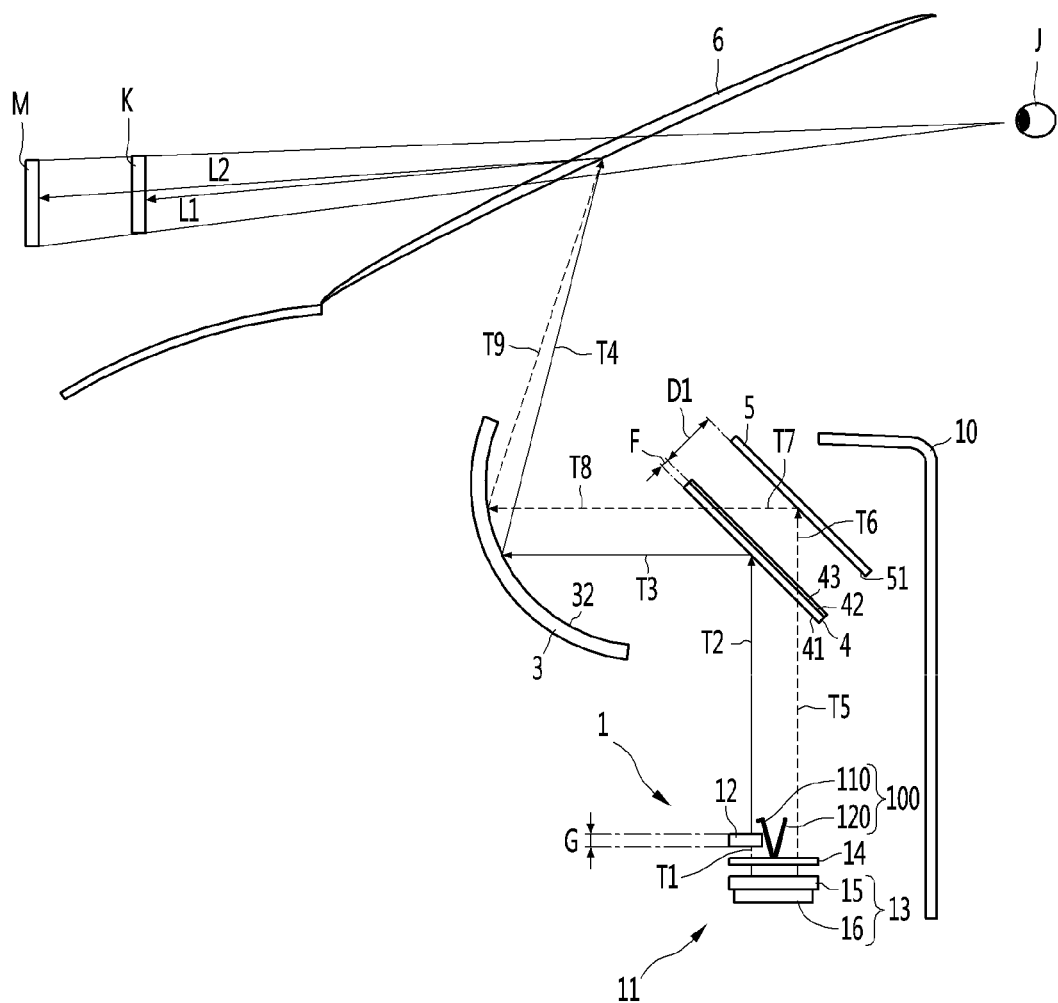
[FIG. 15]

[FIG. 16]
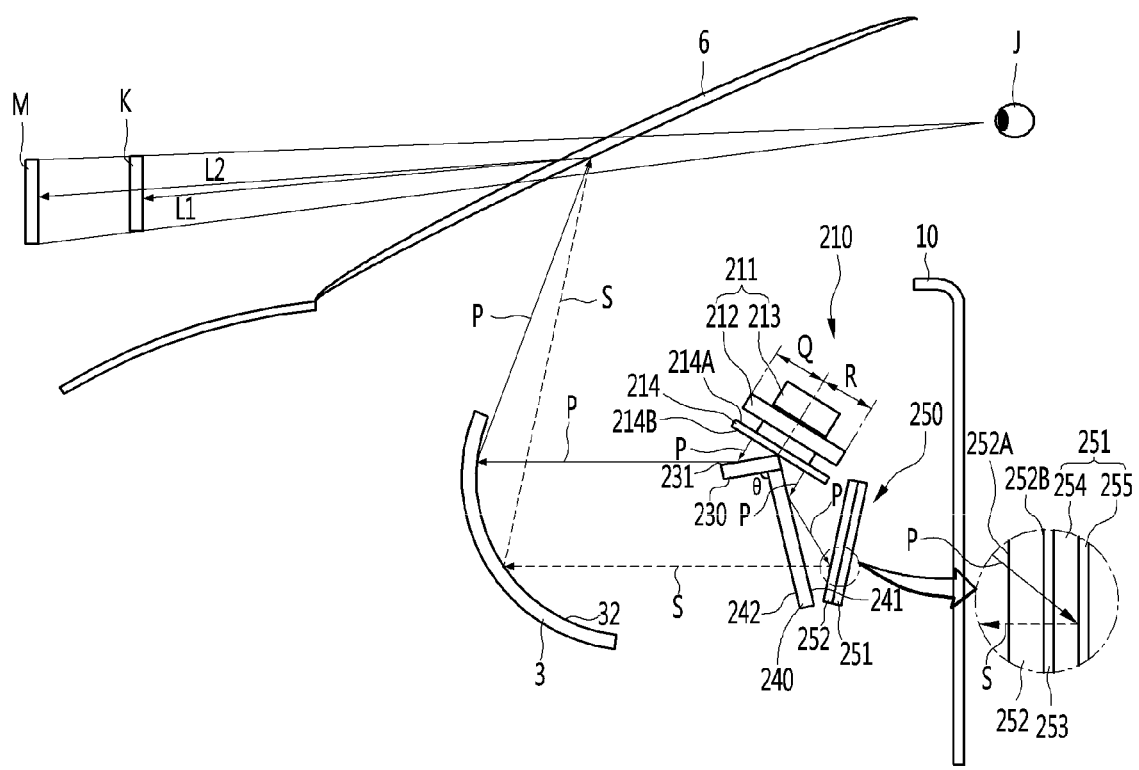

[FIG. 17]
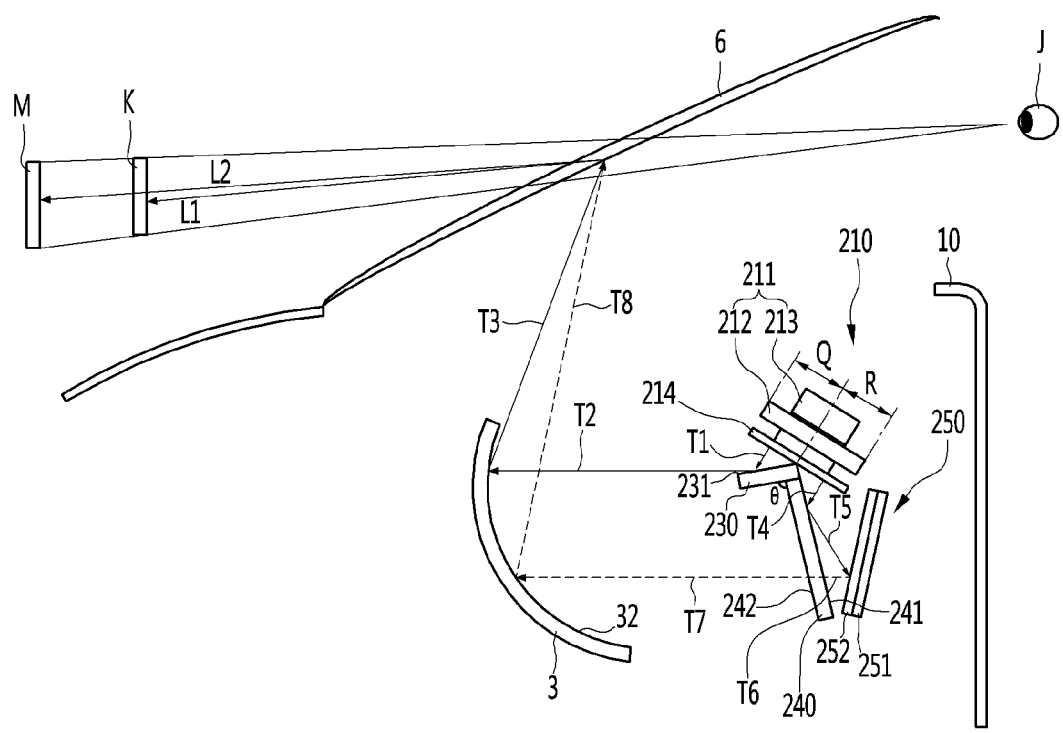

[FIG. 18]
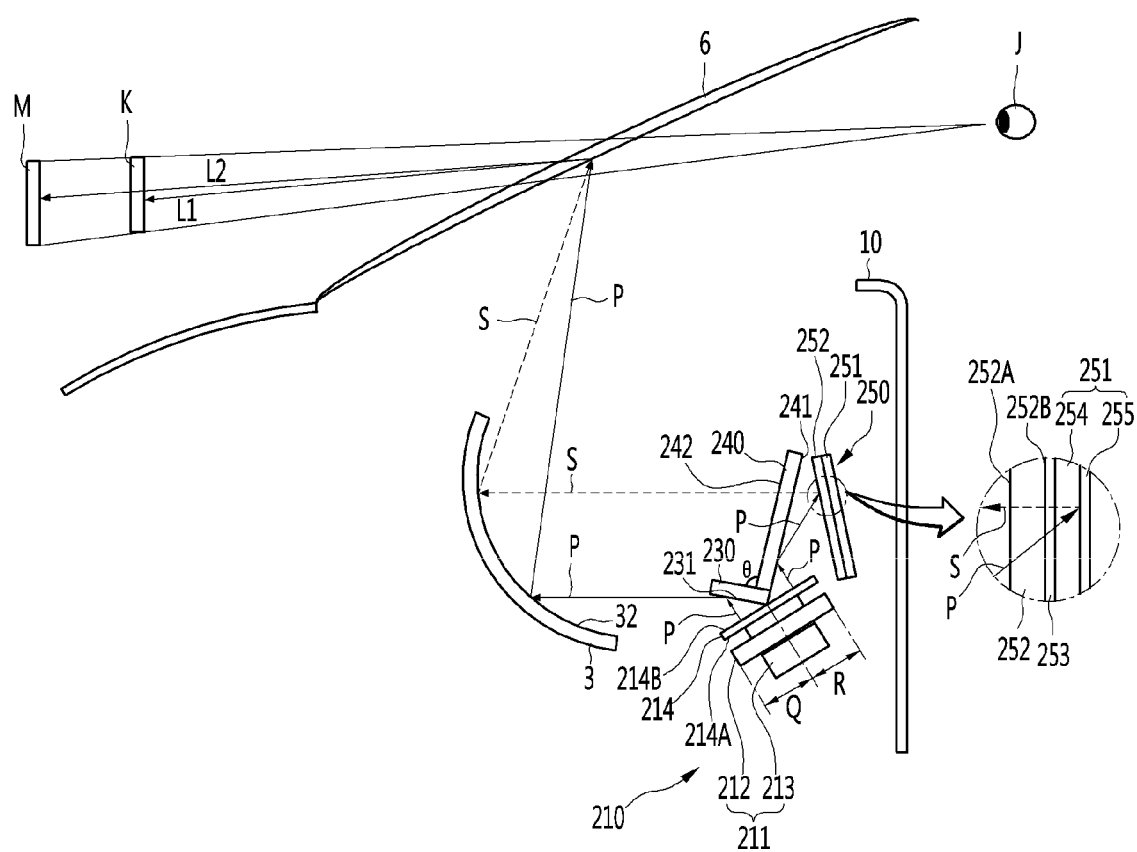

[FIG. 19]
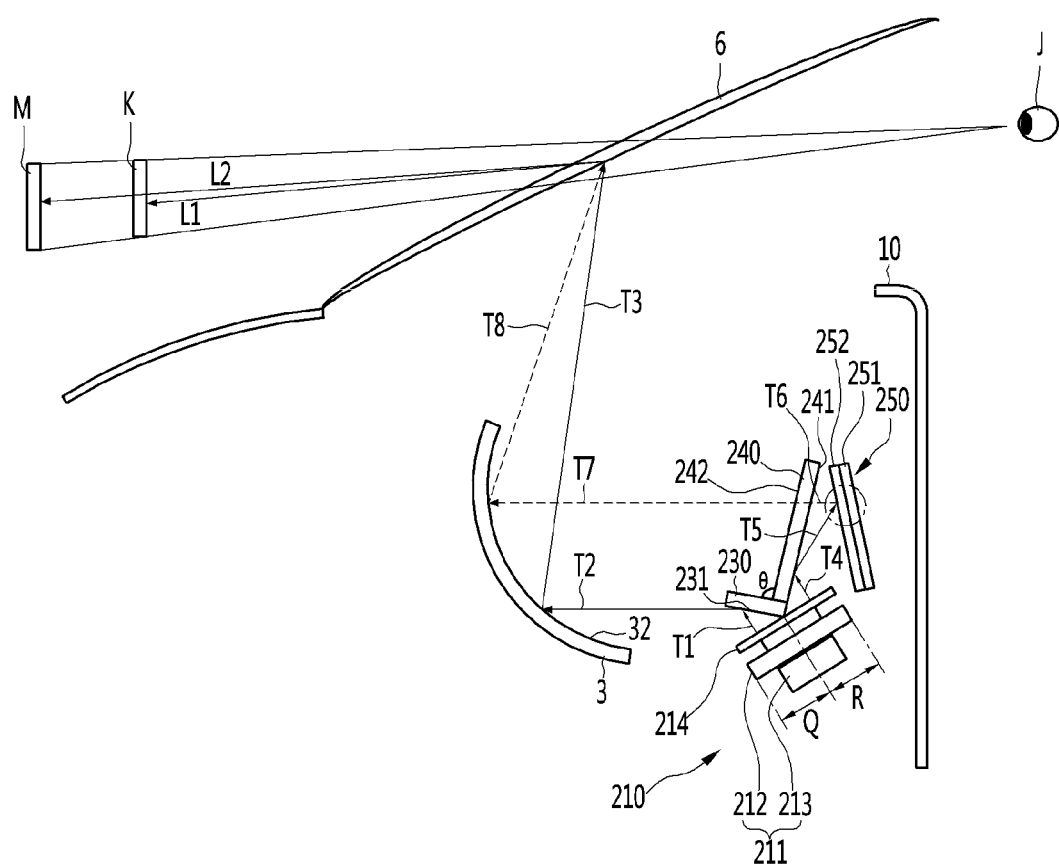

HEAD UP DISPLAY FOR VEHICLE

CROSS REFERENCE TO RELATED APPLICATIONS

This application is the National Phase of PCT International Application No. PCT/KR2018/002274, filed on Feb. 23, 2018, which claims priority under 35 U.S.C. 119(a) to Patent Application Nos. 10-2017-0024204, filed in Republic of Korea on Feb. 23, 2017 and 10-2017-0024207, filed in Republic of Korea on Feb. 23, 2017, all of which are hereby expressly incorporated by reference into the present application.

TECHNICAL FIELD

The present disclosure relates to a head up display for a vehicle, and more particularly to a head up display for a vehicle which may form two virtual images.

BACKGROUND ART

A head up display for a vehicle is included in the vehicle to emit an image light toward a windshield of the vehicle. The head up display for the vehicle may display various information including driving information while driving the vehicle.

The head up display for the vehicle includes a display panel that generates and outputs the image light and at least one mirror that reflects the image light generated from the display panel.

The image light generated from the display panel may be incident on a windshield of the vehicle by the mirror and a driver may recognize a virtual image in front of the windshield.

When the head up display for the vehicle includes two image sources, the head up display for the vehicle may form two virtual images. In this case, a convenience of the head up display for the vehicle may be increased.

KR 10-2015-0093353 A discloses a technology for forming two virtual images using two image sources. However, in this case, a structure is complicated, power consumption is increased, and an overall size is increased due to the two image sources, so that it is difficult to make it compact.

Further, the head-up display for the vehicle is able to form two virtual images by forming two optical paths respectively having total lengths different from each other even when the head-up vehicle includes one image source. As one example, US 2013/0265646 A1 (published Oct. 10, 2013) discloses a technology for forming two virtual images with one image source, one half mirror, and one or three flat mirrors. However, in this case, since the half mirror is used, optical loss is large. Further, since a number of flat mirrors are used to obtain a distance difference between the two virtual images, it is difficult to precisely set a distance between the virtual images due to interferences based on respective sizes of the one half mirror and the plurality of flat mirrors.

Further, US 2015/0061976 A1 (published Mar. 5, 2015) discloses a technology for forming two virtual images using one image source, a plurality of path mirrors, and a light baffle. However, since the plurality of flat mirrors arranged at different angles form an optical path for sequentially reflecting a light, the number of parts is large and a structure thereof is complicated.

DISCLOSURE

Technical Purpose

A purpose of the present disclosure is to provide a head up display for a vehicle that may generate two virtual images.

Another purpose of the present disclosure is to provide a head up display for a vehicle with improved image quality for each virtual image.

Still another purpose of the present disclosure is to provide a head up display for a vehicle that may be made compact while minimizing the number of parts using selective transmission/reflection of a light.

Technical Solution

In one aspect, there is provided a head up display for a vehicle including an imaging mechanism for emitting a linearly-polarized light in a first direction and a linearly-polarized light in a second direction orthogonal to the first direction, a first reflection mirror for reflecting a light to a windshield of the vehicle, a polarization reflection mirror spaced apart from the first reflection mirror wherein the polarization reflection mirror transmits the linearly-polarized light in the first direction and reflects the linearly-polarized light in the second direction, and a second reflection mirror spaced apart from the polarization reflection mirror wherein the second reflection mirror reflects the light transmitted through the polarization reflection mirror to the polarization reflection mirror. The imaging mechanism includes a separating partition for preventing mutual interference between the linearly-polarized light in the first direction and the linearly-polarized light in the second direction.

In one embodiment of the head up display for the vehicle, the imaging mechanism may further include an image source for emitting the linearly-polarized light in the first direction; and a half-wavelength retarder for half-wavelength converting a portion of the linearly-polarized light in the first direction emitted from the image source into the linearly-polarized light in the second direction.

In one embodiment of the head up display for the vehicle, the separating partition may be disposed to be in contact with a light emitting face of the image source.

In one embodiment of the head up display for the vehicle, the image source may include a display panel for emitting an image light, and a linear polarizer for linearly polarizing the image light emitted from the display panel in the first direction. The separating partition may divide the light emitting face of the linear polarizer into a first emitting region and a second emitting region, and the half-wavelength retarder may face the first emitting region.

In one embodiment of the head up display for the vehicle, the first emitting region may face the half-wavelength retarder, and the second emitting region may face one face of the polarization reflection mirror.

In one embodiment of the head up display for the vehicle, the separating partition may include a first partition having a predetermined angle with a light emitting face of the image source, and a second partition disposed to be more distant from the first partition as the second partition becomes more distant from the light emitting face of the image source.

In one embodiment of the head up display for the vehicle, a space opened to face between the first reflection mirror and the polarization reflection mirror may be defined between the first partition and the second partition.

In one embodiment of the head up display for the vehicle, the half-wavelength retarder may be located on an opposite side of the second partition around the first partition.

In one embodiment of the head up display for the vehicle, a protrusion protruding toward the half-wavelength retarder side may be formed on the first partition, and the protrusion may be formed at an end of both ends of the first partition far from the image source.

In one embodiment of the head up display for the vehicle, an angle between the first partition and the light emitting face of the image source may be smaller than an angle between the second partition and the light emitting face of the image source.

In one embodiment of the head up display for the vehicle, an upper end of the first partition may be located above the half-wavelength retarder.

In one embodiment of the head up display for the vehicle, the half-wavelength retarder and the separating partition may be disposed between the light emitting face of the image source and one face of the polarization reflection mirror.

Technical Effect

According to a preferred embodiment of the present disclosure, the polarization reflection mirror selectively transmits/reflects the linearly-polarized light, so that the head up display for the vehicle may be made compact or minimized in size compared to a case in which a light is simply reflected sequentially from a plurality of reflection mirrors.

Further, the linearly-polarized light in the first-direction emitted from the image source may form the virtual images with different distances by four optical structures of the half-wavelength retarder, the polarization reflection mirror, the first reflection mirror, and the second reflection mirror. Therefore, the number of components for forming the virtual images with the different distances may be minimized.

Further, the distance between the polarization reflection mirror and the second reflection mirror may be minimized by the retarder and the head up display for the vehicle may be made more compact.

Further, the retarder is attached to the front face of the second reflection mirror such that an installation of the retarder and the second reflection mirror may become easier and the head up display for the vehicle may become more compact than a case when the retarder and the second reflection mirror are spaced apart from each other.

Further, the second virtual image may be formed to be tilted with a simple structure and a cubic effect may be enhanced.

Further, the lights respectively forming the first virtual image and the second virtual image may not be overlapped or interfered with each other by the separating partition and the image quality of each virtual image may be improved.

Further, the unnecessary peripheral image of each virtual image may be blocked by the separating partition.

Further, the external light or the like entering from the outside of the head up display for the vehicle is reflected by the separating partition such that the driver may be prevented from viewing the unnecessary image.

BRIEF DESCRIPTION OF THE DRAWINGS

FIG. 1 is a side view illustrating main components of a head up display for a vehicle according to a first embodiment of the present disclosure.

FIG. 2 is a side view illustrating an optical path of a head up display for a vehicle according to a first embodiment of the present disclosure.

FIG. 3 is a side view illustrating main components of a head up display for a vehicle according to a second embodiment of the present disclosure.

FIG. 4 is a side view illustrating main components of a head up display for a vehicle according to a third embodiment of the present disclosure.

FIG. 5 is an enlarged side view of a ¼ wavelength retarder, a second reflection mirror, and a polarization reflection mirror illustrated in FIG. 4.

FIG. 6 is a side view illustrating an optical path of a head up display for a vehicle according to a third embodiment of the present disclosure.

FIG. 7 is a side view illustrating main components of a head up display for a vehicle according to a fourth embodiment of the present disclosure.

FIG. 8 is an enlarged side view of a ¼ wavelength retarder, a second reflection mirror, a polarization reflection mirror, and a third reflection mirror illustrated in FIG. 7.

FIG. 9 is a side view illustrating main components of a head up display for a vehicle according to a fifth embodiment of the present disclosure.

FIG. 10 is a side view illustrating main components of a head up display for a vehicle according to a sixth embodiment of the present disclosure.

FIG. 11 is a side view in which a first virtual image is formed to be inclined when a polarization reflection mirror of a head up display for a vehicle according to a seventh embodiment of the present disclosure rotates.

FIG. 12 is a side view in which a second virtual image is formed to be inclined when a second reflection mirror of a head up display for a vehicle according to a seventh embodiment of the present disclosure rotates.

FIG. 13 is a side view illustrating main components of a head up display for a vehicle according to an eighth embodiment of the present disclosure.

FIG. 14 is an enlarged side view of a linear polarizer, a half-wavelength retarder, and a separating partition illustrated in FIG. 13.

FIG. 15 is a side view illustrating an optical path of a head up display for a vehicle according to an eighth embodiment of the present disclosure.

FIG. 16 is a side view illustrating main components of a head up display for a vehicle according to a ninth embodiment of the present disclosure.

FIG. 17 is a side view illustrating an optical path of a head up display for a vehicle according to a ninth embodiment of the present disclosure.

FIG. 18 is a side view illustrating main components of a head up display for a vehicle according to a tenth embodiment of the present disclosure.

FIG. 19 is a side view illustrating an optical path of a head up display for a vehicle according to a tenth embodiment of the present disclosure.

DETAILED DESCRIPTIONS

Hereinafter, specific embodiments of the present disclosure will be described in detail with reference to drawings.

A vertical direction described herein may include not only a vertical direction but also a vertical direction inclined in a rearward direction in a certain angle and a vertical direction forwardly inclined in a certain angle. Further, a front and rear direction described herein may include not only a horizontal direction but also a front and rear direction inclined upwardly in a certain angle and a front and rear direction inclined downwardly in a certain angle.

FIG. 1 is a side view illustrating main components of a head up display for a vehicle according to a first embodiment of the present disclosure. Further, FIG. 2 is a side view illustrating an optical path of a head up display for a vehicle according to a first embodiment of the present disclosure.

The present embodiment includes an imaging mechanism 1, a first reflection mirror 3, a polarization reflection mirror 4, and a second reflection mirror 5.

A head up display for a vehicle may emit an image light towards a windshield 6 of the vehicle. The windshield 6 may be a window that is positioned to face a forward direction of the vehicle. A driver may look at an object in front of the vehicle through the windshield 6. The driver may look at virtual images K and M in front of the windshield 6 via the head up display.

The head up display for the vehicle may be accommodated in or put on an instrument panel 10 in front of a driver's seat of the vehicle and may irradiate the image light in an upward direction.

The imaging mechanism 1 may emit a linearly-polarized light in a first direction and a linearly-polarized light in a second direction that is orthogonal to the first direction.

The imaging mechanism 1 includes an image source 11 for emitting the first linearly-polarized light and a half-wavelength retarder 12 that half-wavelength converts a portion of the linearly-polarized light in the first direction emitted from the image source 11 into a linearly-polarized light in the second direction orthogonal to the first direction 12.

The image source 11 may include a display panel 13 for emitting the image light and a linear polarizer 14 for linearly polarizing the image light emitted from the display panel 13 in the first direction.

The display panel 13 may include a display element 15; and a light source 16 that illuminates a light to the display element 15.

The display panel 13 may emit the image light towards the linear polarizer 14. The display panel 13 is an image generating unit. The display panel 13 may be a display device capable of generating the image light by controlling an electric signal, such as an LCD (liquid crystal display) panel, an LED (light emitting diode) panel, or an OLED (organic light emitting diode) panel, and the like.

The light source 16 may be a backlight unit (BLU) which may emit the light toward the display element 15. The light source 16 may be an LED, an OLED, or the like.

The linear polarizer 14 may pass only the linearly-polarized light in the first direction out of the image lights emitted from the display panel 13. A non-polarized light may be emitted from the display panel 13. The non-polarized light may be polarized in the first direction at the linear polarizer 14. A P-wave linearly-polarized light P or a S-wave linearly-polarized light S may be emitted from the linear polarizer 14.

The linear polarizer 14 may be disposed within the display element 15. In this case, a linearly-polarized light polarized by the linear polarizer 14 may be emitted from the display element 15.

The linear polarizer 14 may be disposed outside the display element 15. In this case, a non-polarized light emitted from the display element 15 may be incident on the linear polarizer 14 and a linear polarized light polarized in the first direction may be emitted from the linear polarizer 14.

When the linear polarizer 14 is disposed outside the display element 15, one face 14An of the linear polarizer 14 may be disposed to face the display element 15 and the other face 14B of the linear polarizer 14 may be disposed to face the polarization reflection mirror 4.

In the linear polarizer 14, said one face 14A facing the display panel 13 may be a light incidence face on which the light is incident and the other face 14B may be a light emitting face.

The linear polarizer 14 may be disposed to cover a light emitting face of the display element 15.

When the display panel 13 emits the non-polarized light in the upward direction, the linear polarizer 14 may be disposed above the display panel 15.

When the display panel 13 emits the non-polarized light in the downward direction, the linear polarizer 14 may be disposed below the display panel 15.

A half-wavelength retarder (half wave plate: HWP) 12 may convert the linearly-polarized light incident from the image source 11 by a half-wavelength.

For example, when the linearly-polarized light emitted from the image source 11 is the P-wave linearly-polarized light P, the P-wave linearly-polarized light P may be incident on the half-wavelength retarder 12, converted into the S-wave linearly-polarized light S at the half-wavelength retarder 12, and emitted from the half-wavelength retarder 12.

Conversely, when the linearly-polarized light emitted from the image source 11 is the S-wave linearly-polarized light S, the S-wave linearly-polarized light S may be incident on the half-wavelength retarder 12, converted into the P-wave linearly-polarized light P at the half-wavelength retarder 12, and emitted from the half-wavelength retarder 12.

The half-wavelength retarder 12 may be disposed between a light emitting face of the image source 11 and one face 41 of the polarization reflection mirror 4. When the image source 11 includes the linear polarizer 14, the light emitting face 14B of the linear polarizer 14 may be the light emitting face of the image source 11.

The half-wavelength retarder 12 may half-wavelength convert a portion of the linearly-polarized light of the first direction emitted from the image source 11 into the linearly-polarized light of the second direction orthogonal to the first direction.

The half-wavelength retarder 12 may be smaller than the linear polarizer 14. The half-wavelength retarder 12 may be smaller than the light emitting face 14B of the linear polarizer 14.

Further, the half-wavelength retarder 12 may face some regions of the linear polarizer 14. The half-wavelength retarder 12 may face only some regions of the light emitting faces 14B of the linear polarizer 14. It is preferable that the half-wavelength retarder 12 does not face other regions of the light emitting face 14B of the linear polarizer 14.

A portion of the linearly-polarized light emitted from the linear polarizer 14 is incident on the half-wavelength retarder 12 and is half-wavelength converted by the half-wavelength retarder 12. The remaining portion of the linearly-polarized light emitted from the linear polarizer 14 may not be incident on the half-wavelength retarder 12 but may be directed to the polarization reflection mirror 4.

The linear polarizer 14 may have a first region Q facing one face of the half-wavelength retarder 12 and a second region R facing one face of the polarization reflection mirror 4.

A linearly-polarized light of the first direction emitted from the first region Q of the linear polarizer 14 may be incident on the half-wavelength retarder 12, half-wavelength-converted into a linearly-polarized light of the second direction, and emitted toward the polarization reflection mirror 4 from the half-wavelength retarder 12.

On the other hand, the linearly-polarized light of the first direction emitted from the second region R of the linear polarizer 14 may not be incident on the half-wavelength retarder 12 but may be directed to the polarization reflection mirror 4 past periphery of the half-wavelength retarder 12.

For example, when the P-wave linearly-polarized light P is emitted from both the first region Q and the second region R of the linear polarizer 14, a P-wave linearly-polarized light P emitted from the first region Q out of the P-wave linearly-polarized light P may be converted into the S-wave linearly-polarized light S at the half-wavelength retarder 12 and then directed to the polarization reflection mirror 4. Further, a P-wave linearly-polarized light P emitted from the second region R out of the P-wave linearly-polarized light P may not be changed in wavelength by the linear polarizer 14 but may be directed to the polarization reflection mirror 4 in the P-wave linearly-polarized light P state.

The imaging mechanism 1, which is a combination of the image source 11 and the half-wavelength retarder 12, may be a kind of heterogeneous linearly-polarized light emitter emitting two linearly-polarized lights having different polarization directions through different regions.

The first reflection mirror 3 may reflect the light to the vehicle's windshield 6.

The first reflection mirror 3 may reflect the light reflected from the polarization reflection mirror 4 or the light transmitted through the polarization reflection mirror 4 toward the windshield 6.

The first reflection mirror 3 may be positioned in front of the polarization reflection mirror 4. A reflection face 32 of the first reflection mirror 3 may face the front face 41 of the polarization reflection mirror 4 in the front and rear direction. The first reflection mirror 3 may be a concave mirror.

The first reflection mirror 3 may be disposed to be inclined at a predetermined angle and may reflect the light reflected from the polarization reflection mirror 4 or transmitted through the polarization reflection mirror 4 in an upward direction.

The polarization reflection mirror 4 may be a beam splitter that transmits a linearly-polarized light in the same direction as the linearly-polarized light emitted from the image source 11 and reflects a linearly-polarized light perpendicular to the linearly-polarized light emitted from image source 11.

The polarization reflection mirror 4 may be formed in a plate shape. One face 41 and the other face 42 of the polarization reflection mirror 4 may respectively refer to a pair of relatively wide faces facing each other of an outer face of the polarization reflection mirror 4.

Said one face 41 of the polarization reflection mirror 4 may disposed to face a front direction and the other face 42 may be disposed to face a rear direction.

The linearly-polarized light of the first direction incident on the polarization reflection mirror 4 may be transmitted through said one face 41 and the other face 42 of the polarization reflection mirror 4. Further, the linearly-polarized light of the second direction incident on the polarization reflection mirror 4 may be reflected from said one face 41 and the other face 42 of the polarization reflection mirror 4.

The polarization reflection mirror 4 may be spaced apart from the first reflection mirror 3 behind the first reflection mirror 3. The polarization reflection mirror 4 may be a selective polarization element that transmits the linearly-polarized light in the first direction and reflects the linearly-polarized light in the second direction. The polarization reflection mirror 4 may preferably be a wire grid polarizer (WGP) disposed behind the first reflection mirror 3. The wire grid polarizer reflects a linearly-polarized light in a direction perpendicular to a polarization transmission axis thereof and transmits a linearly-polarized light in a direction matches the polarization transmission axis thereof.

The polarization reflection mirror 4, the wire grid polarizer, may maintain a brightness of the light between the first and second reflection mirrors 3 and 5 and may maintain its selective transmission/reflection performance while receiving, at a wide incident angle, lights respectively incident from the image source 11, the half-wavelength retarder 12, and the second reflection mirror 5.

When the linearly-polarized light of the first direction is the P-wave linearly-polarized light P, the polarization reflection mirror 4 may transmit the P-wave linearly-polarized light P and reflect the S-wave linearly-polarized light S. Conversely, when the linearly-polarized light of the first direction is the S-wave linearly-polarized light, the polarization reflection mirror 4 may transmit S-wave linearly-polarized light S and reflect the P-wave linearly-polarized light.

The polarization reflection mirror 4 may be located above the half-wavelength retarder 12. Further, the polarization reflection mirror 4 may be disposed behind the first reflection mirror 3.

The polarization reflection mirror 4 may be a wire grid polarizer that transmits the linearly-polarized light of the first direction emitted from the second region R of the image source 11 and reflects the linearly-polarized light of the second direction emitted from the half-wavelength retarder 12 to the first reflection mirror 3.

The linearly-polarized light of the first direction transmitted through the polarization reflection mirror 4 may be incident on the second reflection mirror 5 and may be reflected toward the rear face 42 of the polarization reflection mirror 4 from the second reflection mirror 5. The linearly-polarized light of the first direction reflected toward the rear face 42 of the polarization reflection mirror 4 may be transmitted through the polarization reflection mirror 4 and directed to the first reflection mirror 3 through the front face 41 of the polarization reflection mirror 4.

The polarization reflection mirror 4, which is the selective polarization element, may implement two virtual images while minimizing a loss of light compared to that of a half mirror and may lower a brightness of the image source 11 because the loss of light is small. Further, the polarization reflection mirror 4 may reduce a power consumption of the image source 11 and may reduce a size of a heat dissipating unit (not shown) that dissipates heat of the image source 11 or may simplify a structure of the heat dissipating unit.

For front reflection of the linearly-polarized light in the second direction and front transmission of the linearly-polarized light in the first direction, the polarization reflection mirror 4 may be disposed between the first reflection mirror 3 and the second reflection mirror 5, and may be disposed to be inclined between the first reflection mirror 3 and the second reflection mirror 5.

Because the polarization reflection mirror 4 selectively transmits/reflects the linearly-polarized light between two reflection mirrors 3 and 5, the present embodiment may minimize the number of multiple optical components to form the two virtual images and may compact the overall size of the head up display for the vehicle.

The polarization reflection mirror 4 may be inclined such that a front face 41 thereof faces a forward and downward direction. The polarization reflection mirror 4 may have the rear face 42 thereof facing a rearward and upward direction and the rear face 42 of the polarization reflection mirror 4 may face the front face 51 of the second reflection mirror 5.

The polarization reflection mirror 4 may further include an anti-reflection coated layer 43 formed on the face 42 facing the second reflection mirror 5 out of the both faces 41 and 42. In this connection, the anti-reflection coated layer 43 may reduce a surface reflection of the face 42 facing the second reflection mirror 5 out of the polarization reflection mirror 4. Further, the anti-reflection coated layer 43 may reduce a noise due to undesired reflected light of the transmitted light.

That is, the polarization reflection mirror 4 may increase an amount of light transmitted through the polarization reflection mirror 4 after being reflected from the second reflection mirror 5 by the anti-reflection coated layer 43.

The linearly-polarized light in the first direction reflected from the second reflection mirror 5 and then incident on the polarization reflection mirror 4 may be incident on the polarization reflection mirror 4 while minimizing the surface reflection by the anti-reflection coated layer 43.

The second reflection mirror 5 is spaced apart from the polarization reflection mirror 4 and may reflect the light transmitted through the polarization reflection mirror 4 to the polarization reflection mirror 4.

The second reflection mirror 5 may be disposed to face the polarization reflection mirror 4. The second reflection mirror 5 is a flat mirror placed facing the polarization reflection mirror 4.

Said one face 51 of the second reflection mirror 5 may face the other face 42 of the polarization reflection mirror 4. Said one face 51 of the second reflection mirror 5 may be a front face facing the forward direction.

The linearly-polarized light in the second direction, which is transmitted through the polarization reflection mirror 4 and is incident on the second reflection mirror 5, may be reflected on said one face 51 of the second reflection mirror 5 and directed to the polarization reflection mirror 4.

The second reflection mirror 5 may be spaced apart from the polarization reflection mirror 4 by a predetermined distance D1.

The second reflection mirror 5 may be disposed parallel to the polarization reflection mirror 4. The second reflection mirror 5 may be disposed to be inclined such that the front face 51 thereof faces the forward and downward direction.

The head-up display of the present disclosure as described above may form a first virtual image K at a first position close to the windshield 6 and a second virtual image M at a second position relatively farther away from windshield 6.

The first virtual image K may be formed by a short-range optical path from the image source 11, through the half-wavelength retarder 12, the polarization reflection mirror 4, and the first reflection mirror 3, to the windshield 6.

Further, the second virtual image M may be formed by a long-range optical path from the image source 11, through the polarization reflection mirror 4, the second reflection mirror 3, the polarization reflection mirror 4, and the first reflection mirror 3, to the windshield 6.

The long-range optical path may further include a length that the linearly-polarized light in the first direction travels from the polarization reflection mirror 4 to the second reflection mirror 5 and a length that the linearly-polarized light in the first direction reflected from the second reflection mirror 5 travels to the polarization reflection mirror 4. Further, the long-range optical path may further include a length of twice a thickness F of the polarization reflection mirror 4 than the short-range optical path.

In more detail, the short-range optical path may include a first path T1 along which the linearly-polarized light of the first direction emitted from the imaging mechanism 1 is incident on the half-wavelength retarder 12, a second path T2 along which the linearly-polarized light of the second direction emitted from the half-wavelength retarder 12 is incident on the polarization reflection mirror 4, a third path T3 along which the linearly-polarized light of the second direction reflected from the polarization reflection mirror 4 is incident on the first reflection mirror 3, and a fourth path along which the linearly-polarized light of the second direction reflected from the first reflection mirror 3 is incident on the windshield 6.

On the other hand, the long-range optical path may include a fifth path T5 along which the linearly-polarized light of the first direction emitted from the imaging mechanism 1 is incident on the polarization reflection mirror 4, a sixth path T6 along which the linearly-polarized light of the first direction transmitted through the polarization reflection mirror 4 is incident on the second reflection mirror 5, a seventh path T7 along which the linearly-polarized light of the first direction reflected from the second reflection mirror 5 is incident on the polarization reflection mirror 4, an eighth path T8 along which the linearly-polarized light of the first direction transmitted through the polarization reflection mirror 4 is incident on the first reflection mirror 3, and a ninth path T9 along which the linearly-polarized light of the first direction reflected from the reflection mirror 3 is incident on the windshield 6.

In this connection, a length of the fifth path T5 may correspond to a sum of a length of the first path T1, a thickness G of the half-wavelength retarder 12, and a length of the second path T2.

Further, the eighth path T8 may correspond to the third path T3 and the ninth path T9 may correspond to the fourth path T4.

A length L2 of the long-range optical path may be longer than a length L1 of the short-range optical path by a sum of twice the thickness F of the polarization reflection mirror 4, a length of the sixth path T6, and a length of the seventh path T7.

Hereinafter, an operation of the present embodiment will be described.

For convenience of description, an example in which the P-wave linearly-polarized light P is emitted from the image source 11 will be described.

A portion of the P-wave linearly-polarized light P emitted from the image source 11 may be converted into the S-wave linearly-polarized light S by the half-wavelength retarder 12 and then directed to the polarization reflection mirror 4 and the remaining portion may be directed to the polarization reflection mirror 4 with a state in which the wavelength thereof is not converted.

The S-wave linearly-polarized light S incident on the front face 41 of the polarization reflection mirror 4 may be reflected from the polarization reflection mirror 4 to the first reflection mirror 3 and may be reflected from the first reflection mirror 3 to the windshield 6.

On the other hand, the P-wave linearly-polarized light P incident on the front face 41 of the polarization reflection mirror 4 may be transmitted through the polarization reflection mirror 4 to the second reflection mirror 5 and may be reflected from the second reflection minor 5 to the polarization reflection mirror 4. The P-wave linearly-polarized light P reflected from the second reflection mirror 5 to the polarization reflection mirror 4 may be transmitted through the polarization reflection mirror 4 and then directed to the first reflection mirror 3. Then, the P-wave linearly-polarized light P directed to the first reflection mirror 3 may be reflected from the first reflection mirror 3 to the windshield 6.

The driver may recognize the first virtual image K formed by the short-range optical path and the second virtual image M formed by the long-range optical path through windshield 6.

The head up display for the vehicle may form the two virtual images K and M with different distances from the windshield 6. As such, the two virtual images K and M having different distances may be recognized by an eye J of the driver boarding the vehicle.

Further, an example in which the S-wave linearly-polarized light S is emitted from the image source 11 differs from the example in which the P-wave linearly-polarized light P is emitted from the image source 11 only in a type of the linearly-polarized light and operations in both examples are the same. Therefore, a detailed description of the operations will be omitted in order to avoid redundant descriptions.

FIG. 3 is a side view illustrating main components of a head up display for a vehicle according to a second embodiment of the present disclosure.

Only a difference between the present embodiment and the first embodiment of the present disclosure is an imaging mechanism 1'. Other components and operations other than the imaging mechanism 1' of the present embodiment are the same as or similar to that of the first embodiment of the present disclosure, so that the present embodiment uses the same reference numerals. Further, a detailed description of other components and operations of the present embodiment will be omitted.

The imaging mechanism 1' of the present embodiment may include a display panel 13 for emitting the image light, a first linear polarizer 14' for linearly polarizing the image light emitted from the display panel 13 in the first direction, and a second linear polarizer 14" for linearly polarizing the image light emitted from the display panel 13 in the second direction orthogonal to the first direction.

The display panel 13 may include the display element 15 and the light source 16 as in the first embodiment of the present disclosure, and a detailed description thereof will be omitted.

The first linear polarizer 14' and the second linear polarizer 14" may be arranged to face different regions of the display panel 13.

The first linear polarizer 14' and the second linear polarizer 14" may respectively transmit linearly-polarized lights in different directions.

The first linear polarizer 14' may transmit only a linearly-polarized light of the first direction out of the image light emitted from the display panel 13. A non-polarized light may be emitted from the display panel 13 and the non-polarized light may be polarized in the first direction from the first linear polarizer 14'.

The second linear polarizer 14" may transmit only a linearly-polarized light of the second direction out of the image light emitted from the display panel 13. The non-polarized light may be emitted from the display panel 13 and the non-polarized light may be polarized in the second direction from the second linear polarizer 14".

When the P-wave linear polarized light P is emitted from the first linear polarizer 14', the second linear polarizer 14" may emit the S-wave linearly-polarized light S. Conversely, when the S-wave linearly-polarized light S is emitted from the first linear polarizer 14', the P-wave linearly-polarized light P may be emitted from the second linear polarizer 14".

A light incidence face 14A' of the first linear polarizer 14' may face a portion of the light emitting face of the display panel 13 and a light incidence face 14A" of the second linear polarizer 14" light may face other portions of the light emitting face of the display panel 13.

A light emitting face 14B' of the first linear polarizer 14' may face a portion of the polarization reflection mirror 4 and a light emitting face 14B" of the second linear polarizer 14" may face another portion of the polarization reflection mirror 4.

The polarization reflection mirror 4 may transmit a linearly-polarized light emitted from one of the first linear polarizer 14' and the second linear polarizer 14" and may reflect a linearly-polarized light emitted from the remaining portion of the first linear polarizer 14' and the second linear polarizer 14".

Further, the polarization reflection mirror 4 may be disposed to face both the first linear polarizer 14' and the second linear polarizer 14" in the vertical direction and to face the first reflection mirror 3 in the front and rear direction.

The polarization reflection mirror 4 may include a first region facing the first linear polarizer 14' in the vertical direction and a second region facing the second linear polarizer 14" in the vertical direction. The linearly-polarized light in the first direction may be incident on the first region of the polarization reflection mirror 4 and the linearly-polarized light in the first direction incident on the first region may be transmitted through the polarization reflection mirror 4 and incident on the second reflection mirror 5.

The linearly-polarized light in the second direction emitted from the second linear polarizer 14" may be incident on the second region of the polarization reflection mirror 4 and the linearly-polarized light in the second direction incident on the second region may be reflected from the polarization reflection mirror 4 to the first reflection mirror 3.

The present embodiment may form a first virtual image K at a first position close to the windshield 6 and a second virtual image M at a second position that is relatively farther away from windshield 6.

The first virtual image K may be formed by a short-range optical path from the display panel 13, through the second linear polarizer 14", the polarization reflection mirror 4, and the first reflection mirror 3, to the windshield 6.

Further, the second virtual image M may be formed by a long-range optical path from the display panel 13, through the first linear polarizer 14', the polarization reflection mirror 4, the second reflection mirror 3, the polarization reflection mirror 4, and the first reflection mirror 3, to the windshield 6.

Hereinafter, an operation of the present embodiment will be described.

Hereinafter, for convenience of description, an example in which the linearly-polarized light of the first direction is the P-wave linearly-polarized light and the linearly-polarized light of the second direction the S-wave linearly-polarized light will be described.

A non-polarized image light emitted from the display panel 13 may be dispersed into the first linear polarizer 14' and the second linear polarizer 14".

The light incident on the first linear polarizer 14' may be linearly polarized at the first linear polarizer 14' and the P-wave linearly-polarized light P may be emitted from the first linear polarizer 14'.

Further, the light incident on the second linear polarizer 14" may be linearly polarized at the second linear polarizer 14" and the S-wave linearly-polarized light S may be emitted from the second linear polarizer 14".

The S-wave linearly-polarized light S emitted from the second linear polarizer 14" may be reflected from the polarization reflection mirror 4 to the first reflection mirror 3 and reflected from the first reflection mirror 3 to the windshield 6.

On the other hand, the P-wave linearly-polarized light P emitted from the first linear polarizer 14' may be transmitted through the polarization reflection mirror 4 to the second reflection mirror 5 and may be reflected from the second reflection mirror 5 to the polarization reflection mirror 4. The P-wave linearly-polarized light P reflected from the second reflection mirror 5 to the polarization reflection mirror 4 may be transmitted through the polarization reflection mirror 4 and then be directed to the first reflection mirror 3. Then, the P-wave linearly-polarized light P directed to the first reflection mirror 3 may be reflected from the first reflection mirror 3 to the windshield 6.

The driver may recognize the first virtual image K formed by the short-range optical path and the second virtual image M formed by the long-range optical path through the windshield 6.

Further, an example in which the linearly-polarized light in the first direction is the S-wave linearly-polarized light S and the linearly-polarized light in the second direction is the P-wave linearly-polarized light P differs from the example above only in a type of the linearly-polarized light and operations in both examples are the same. Therefore, a detailed description of the operations will be omitted to avoid redundant descriptions.

FIG. 4 is a side view illustrating main components of a head up display for a vehicle according to a third embodiment of the present disclosure. Further, FIG. 5 is an enlarged side view of a ¼ wavelength retarder, a second reflection mirror, and a polarization reflection mirror illustrated in FIG. 4. Further, FIG. 6 is a side view illustrating an optical path of a head up display for a vehicle according to a third embodiment of the present disclosure.

The present embodiment may include a quarter-wavelength retarder 7 disposed between the polarization reflection mirror 4 and the second reflection mirror 5. Other components and operations of the present embodiment are the same as or similar to that of the first embodiment or the second embodiment of the present disclosure, except that the present embodiment further includes the quarter-wavelength retarder 7, therefore, a detailed description of other components and operations will be omitted.

The quarter-wavelength retarder 7 may be a quarter-wave plate that retards a phase of an incident linearly-polarized light by a quarter-wavelength.

One face 74 and the other face 73 of the quarter-wavelength retarder 7 may respectively refer to a pair of relatively wide faces facing each other of an outer face of the quarter-wavelength retarder 7.

One face 74 of the quarter-wavelength retarder 7 may be a front face facing a forward direction and the other face 73 thereof may be a rear face facing a rearward direction.

The quarter-wavelength retarder 7 may be attached to a face out of both faces of the second reflection mirror 5 facing the polarization reflection mirror 4. The quarter-wavelength retarder 7 may be attached to the front face 51 of the second reflection mirror 5.

In combination of the quarter-wavelength retarder 7 and the second reflective mirror 5, the quarter-wavelength retarder 7 and the second reflective mirror 5 may convert the linearly-polarized light in the first direction transmitted through the polarization reflection mirror 4 into the linearly-polarized light in the second direction and reflect the linearly-polarized light in the second direction.

In the present embodiment, disposition angles of the image source 11, the half-wavelength retarder 12, the first reflection mirror 3, the polarization reflection mirror 4, and the second reflection mirror 5 may be the same as that in the first embodiment of the present disclosure and locations of the image source 11, the half-wavelength retarder 12, the first reflection mirror 3, and the polarization reflection mirror 4 may also be the same as that in the first embodiment of the present disclosure.

In the present embodiment, however, a distance D2 between the second reflection mirror 5 and the polarization reflection mirror 4 may be shorter than the distance D1 between the second reflection mirror 5 and the polarization reflection mirror 4 in the first embodiment or the second embodiment of the present disclosure.

In combination with the quarter-wavelength retarder 7 and the second reflection mirror 5, the quarter-wavelength retarder 7 and the second reflection mirror 5 may function as a half-wavelength retarder that reflects the incident linearly-polarized light while converting the wavelength thereof. Further, the quarter-wavelength retarder 7 and the second reflection mirror 5 may induce the linearly-polarized light to be reflected multiple times from the polarization reflection mirror 4 and the second reflection mirror 5 or may reduce a space between the polarization reflection mirror 4 and the second reflection mirror 5.

The second reflection mirror 5 may include a transparent plate 5A and a reflective layer 5B in contact with the transparent plate 5A. The reflective layer 5B may be positioned on the opposite side of the polarization reflection mirror 4 around the transparent plate 5A.

A distance between the second reflection mirror 5 and the quarter-wavelength retarder 7 is preferably as close as possible. The second reflection mirror 5 and the quarter-wavelength retarder 7 are preferably integrated.

The quarter-wavelength retarder 7 may be attached to the front face 51 of the second reflection mirror 5 with an adhesive 72. A rear face 73 of the quarter-wavelength retarder 7 may be attached to the front face 51 of the transparent plate 5A with an adhesive, in particular a transparent adhesive. A front face 74 of the quarter-wavelength retarder 7 may face the polarization reflection mirror 4. The front face 74 of the quarter-wavelength retarder 7 may be spaced apart from the polarization reflection mirror 4.

In the present embodiment, a short-range optical path may be the same as that of the first embodiment or second embodiment of the present disclosure and a detailed description thereof will be omitted.

In the present embodiment, some paths of a long-range optical path may be different from the first embodiment or second embodiment of the present disclosure and the remaining paths of the long-range optical path may be the same as that in the first embodiment or second embodiment of the present disclosure.

A fifth path T5, an eighth path T8, and a ninth path T9 of the long-range optical path of the present embodiment may be the same as that of the first embodiment of the present disclosure.

A sixth path T6A and T6B of the long-range optical path of the present embodiment may be different from the sixth path T6 of the first embodiment of the present disclosure and a seventh path T7A and T7B of the long-range optical path of the present embodiment may be different from the seventh path T7 of the first embodiment of the present disclosure.

The sixth path T6A and T6B of the present embodiment includes a path T6A along which the linearly-polarized light of the first direction transmitted through the polarization reflection mirror 4 is converted into a circularly-polarized light by the quarter-wavelength retarder 7 and then the circularly-polarized light is incident on the second reflection mirror 5. Further, the sixth path T6A and T6B further includes a path T6B along which the circularly-polarized light incident on the second reflection mirror 5 is reflected to the quarter-wavelength retarder 7 by the second reflection mirror 5 and then converted into the linearly-polarized light in the second direction by the quarter-wavelength retarder 7, and then the linearly-polarized light in the second direction is incident on the polarization reflection mirror 4.

Further, the seventh path T7A and T7B includes a path T7A along which the linearly-polarized light in the second direction incident on the polarization reflection mirror 4 from the quarter-wavelength retarder 7 is reflected to the quarter-wavelength retarder 7 by the polarization reflection mirror 4 and then converted into the circularly-polarized light by the quarter-wavelength retarder 7, and then the circularly-polarized light is incident on the second reflection mirror 5. Further, the seventh path T7A and T7B further includes a path T7B along which the circularly-polarized light incident on the second reflection mirror 5 from the quarter-wavelength retarder 7 is reflected to the quarter-wavelength retarder 7 by the second reflection mirror 5 and converted into the linearly-polarized light in the first direction by the quarter-wavelength retarder 7 and then the linearly-polarized light in the first direction is incident on the polarization reflection mirror 4.

In the present embodiment, the linearly-polarized light transmitted through the polarization reflection mirror 4 may be reflected in a zig-zag shape while changing the wavelength thereof between the polarization reflection mirror 4 and the second reflection mirror 5.

The linearly-polarized light transmitted through the polarization reflection mirror 4 is reflected once by the polarization reflection mirror 4 between the polarization reflection mirror 4 and the second reflection mirror 5 and reflected twice by the second reflection mirror 5, which is three times in total. The present embodiment may place the second reflection mirror 5 closer to the polarization reflection mirror 4 than the first embodiment of the present disclosure due to these reflections of three times.

That is, the present embodiment may reduce a distance between the polarization reflection mirror 4 and the second reflection mirror 5 by the quarter-wavelength retarder 7 and may have a more compact size than the first embodiment.

Hereinafter, an operation of the present embodiment will be described as follows.

For convenience of description, an example in which the P-wave linearly-polarized light P is emitted from the image source 11 will be described as follows.

A portion of the P-wave linearly-polarized light P emitted from the image source 11 is converted into the S-wave linearly-polarized light S by the half-wavelength retarder 12 and then directed to the polarization reflection mirror 4. The S-wave linearly-polarized light S incident on the front face 41 of the polarization reflection mirror 4 is reflected to the first reflection mirror 3 by the polarization reflection mirror 4 and then reflected to the windshield 6 by the first reflection mirror 3. In this case, the driver may recognize the first virtual image K formed by the short-range optical path through the windshield 6.

The remaining portion of the P-wave linearly-polarized light P emitted from the image source 11 may be directed to the polarization reflection mirror 4 with the wavelength thereof unconverted. The P-wave linearly-polarized light P incident on the front face of the polarization reflection mirror 4 may be transmitted through the polarization reflection mirror 4 and be directed to the second reflection mirror 5.

The P-wave linearly-polarized light P emitted from the polarization reflection mirror 4 toward the second reflection mirror 5 is converted into the circularly-polarized light by the quarter-wavelength retarder 7 and then reflected by the second reflection mirror 5 to the quarter-wavelength retarder 7 and the S-wave linearly-polarized light S may be emitted from the quarter-wavelength retarder 7 towards the polarization reflection mirror 4.

The S-wave linearly-polarized light S emitted from the quarter-wavelength retarder 7 toward the polarization reflection mirror 4 may not be transmitted through the polarization reflection mirror 4 but reflected from the rear face of the polarization reflection mirror 4 toward the second reflection mirror 5. The S-wave linearly-polarized light S reflected from the polarization reflection mirror 4 toward the second reflection mirror 5 is converted into the circularly-polarized light by the quarter-wavelength retarder 7 and then reflected by the second reflection mirror 5 to the quarter-wavelength retarder 7 and the P-wave linearly-polarized light P may be emitted from the quarter-wavelength retarder 7 and directed to the polarization reflection mirror 4.

The P-wave linearly-polarized light P emitted from the quarter-wavelength retarder 7 to the polarization reflection mirror 4 may be transmitted through the polarization reflection mirror 4 and then be directed to the first reflection mirror 3. Further, the P-wave linearly-polarized light P directed to the first reflection mirror 3 may be reflected to the windshield 6 by the first reflection mirror 3. In this case, the driver may recognize a second virtual image M formed by the long-range optical path.

The head up display for the vehicle may form two virtual images K and M with different distances from the windshield 6. The driver's eye J may recognize both the first virtual image K formed by the short-range optical path and the second virtual image M formed by the long-range optical path through windshield 6.

An example in which the S-wave linearly-polarized light S emitted from the image source 11 differs from the example in which the P-wave linearly-polarized light P is emitted from the image source 11 only in a type of the linearly-polarized light and operations in both examples are the same. Therefore, a detailed description of the operations will be omitted to avoid redundant descriptions.

FIG. 7 is a side view illustrating main components of a head up display for a vehicle according to a fourth embodiment of the present disclosure. Further, FIG. 8 is an enlarged side view of a ¼ wavelength retarder, a second reflection mirror, a polarization reflection mirror, and a third reflection mirror illustrated in FIG. 7.

The present embodiment further includes a third reflection mirror 8 disposed on a portion of a front face of the quarter-wavelength retarder 7, as shown in FIGS. 7 and 8. Other components and operations of the present embodiment are the same as or similar to that of the third embodiment the present disclosure, except that the present embodiment further includes the third reflection mirror 8, therefore, a detailed description of other components and operations will be omitted.

The third reflection mirror 8 may be positioned between the quarter-wavelength retarder 7 and the polarization reflection mirror 4.

The third reflection mirror 8 may be a mirror reflecting a light reflected from the polarization reflection mirror 4 back to the polarization reflection mirror 4. The third reflection mirror 8 may be disposed to face the polarization reflection mirror 4 and may be spaced apart from the polarization reflection mirror 4. The third reflection mirror 8 may be attached to the front face of the quarter-wavelength retarder 7. The third reflection mirror 8 may be attached to the front face of the quarter-wavelength retarder 7 at a distance from the polarization reflection mirror 4.

The third reflection mirror 8 may be a flat mirror attached to the front face of the quarter-wavelength retarder 7.

The third reflection mirror 8 may include a transparent plate 80A and a reflective layer 80B positioned between the transparent plate 80A and the quarter-wavelength retarder 7.

The third reflection mirror 8 may be attached to the front face of the quarter-wavelength retarder 7 by an adhesive. The reflective layer 80B of the third reflection mirror 8 may be attached to the front face of the quarter-wavelength retarder 7.

The third reflection mirror 8 may be smaller than the second reflection mirror 5 and smaller than the quarter-wavelength retarder 7.

In the present embodiment, the quarter-wavelength retarder 7, the second reflection mirror 5, and the third reflection mirror 8 may be configured in one mirror assembly.

This mirror assembly may include a reflection region where the third reflection mirror 8 is located and a wavelength conversion and reflection region where the third reflection mirror 8 is not located.

The reflection region may be a first region where the linearly-polarized light reflected from the polarization reflection mirror 4 is totally reflected to the polarization reflection mirror 4 without wavelength conversion.

Further, the wavelength conversion and reflection region may be a second region where the linearly-polarized light reflected from the polarization reflection mirror 4 is transmitted through the quarter-wavelength retarder 7 and then reflected on the second reflection mirror 5 back to the quarter-wavelength retarder 7.

An operation of the present embodiment will be described in detail with reference to FIGS. 7 and 8 as follows. Hereinafter, an example in which the P-wave linearly-polarized light P is emitted from the image source 11 will be described for convenience.

As in the third embodiment of the present disclosure, the P-wave linearly-polarized light P transmitted through the polarization reflection mirror 4 after being emitted from the image source 11 may be directed to the second reflection mirror 5, converted into the circularly-polarized light by the quarter-wavelength retarder 7, and then reflected to the quarter-wavelength retarder 7 by the second reflection mirror 5. From the quarter-wavelength retarder 7, the S-wave linearly-polarized light S may be emitted towards the polarization reflection mirror 4 as in the third embodiment of the present disclosure.

The S-wave linearly-polarized light S emitted from the quarter-wavelength retarder 7 toward the polarization reflection mirror 4 may not be transmitted through the polarization reflection mirror 4 as in the third embodiment of the present disclosure, but may be reflected from the rear face of the polarization reflection mirror 4. The S-wave linearly-polarized light S reflected from the polarization reflection mirror 4 may be incident on the third reflection mirror 8 and then totally reflected to the polarization reflection mirror 4 by the third reflection mirror 8 as shown in FIG. 8.

The S-wave linearly-polarized light S reflected to the polarization reflection mirror 4 by the third reflection mirror 8 may not be transmitted through the polarization reflection mirror 4, but may be reflected from the rear face of the polarization reflection mirror 4 toward the second reflection mirror 5. The S-wave linearly-polarized light reflected from the rear face of the polarization reflection mirror 4 toward the second reflection mirror 5 may be converted into the circularly-polarized light by the quarter-wavelength retarder 7 and then reflected from the second reflection mirror 5 to the quarter-wavelength retarder 7. From the quarter-wavelength retarder 7, the P-wave linearly-polarized light P may be emitted and directed to the polarization reflection mirror 4 as in the third embodiment of the present disclosure.

As in the third embodiment of the present disclosure, the P-wave linearly-polarized light P emitted to the polarization reflection mirror 4 from the quarter-wavelength retarder 7 may be directed to the first reflection mirror 3 after being transmitted through the polarization reflection mirror 4. The P-wave linearly-polarized light P directed to the first reflection mirror 3 may be reflected to the windshield 6 by the first reflection mirror 3. In this case, the driver may recognize a second virtual image M formed by a long-range optical path.

In the present embodiment, the second virtual image M may be formed at a longer distance than that of the third embodiment. The present embodiment may further include an optical path from the rear face of the polarization reflection mirror 4 to the third reflection mirror 8 and an optical path from the third reflection mirror 8 to the rear face of the polarization reflection mirror 4. Due to these two optical paths, the second virtual image M may be formed at a longer distance than that of the third embodiment of the present disclosure.

On the contrary, when it is assumed that the distances at which the second virtual image M is formed are the same in the present embodiment and the third embodiment of the present disclosure, a distance D3 between the polarization reflection mirror 4 and the second reflection mirror 5 may be smaller than the distance D2 between the polarization reflection mirror 4 and the second reflection mirror 5 of the third embodiment. In this case, a width in a front and rear direction of the head-up display for the vehicle may be smaller than that of the third embodiment of the present disclosure.

FIG. 9 is a side view illustrating main components of a head up display for a vehicle according to a fifth embodiment of the present disclosure.

In the present embodiment, a second reflection mirror 5' may be inclined to the polarization reflection mirror 4. However, other components and operations in the present embodiment are the same as or similar to that of the first to third embodiments of the present disclosure, so that the present embodiment uses the same reference numerals and a detailed description of other components and operations in the present embodiment will be omitted.

The second reflection mirror 5' may be disposed such that a front face thereof faces the rear face 42 of the polarization reflection mirror 4, but the second reflection mirror 5' may be disposed not to be parallel to the polarization reflection mirror 4.

The second reflection mirror 5' may be disposed such that a longitudinal extension of the second reflection mirror 5' and a longitudinal extension of the polarization reflection mirror 4 intersect with each other.

In this case, the second reflection mirror 5' may reflect the first linearly-polarized light obliquely toward the polarization reflection mirror 4. The first linearly-polarized light obliquely incident on the polarization reflection mirror 4 from the second reflection mirror 5 may be transmitted through the polarization reflection mirror 4 and then reflected from the first reflection mirror 3 to the windshield 6.

A second virtual image M' positioned at a second position from the windshield 6 may be inclined at a predetermined angle in preparation for a case PA in which the second reflection mirror 5' and the polarization reflection mirror 4 are parallel to each other.

FIG. 10 is a side view illustrating main components of a head up display for a vehicle according to a sixth embodiment of the present disclosure.

The half-wavelength retarder 12 of the present embodiment is disposed to face a portion of the emitting face of the image source 11. Further, in the present embodiment, a prism 9 disposed between the image source 11 and the polarization reflection mirror 4 may be further included. However, other components and operations except the prism 9 in the present embodiment are the same as or similar to that of the third embodiment of the present disclosure, so that the present embodiment uses the same reference numerals and a detailed description of other components and operations in the present embodiment will be omitted.

The prism 9 may refract a first linearly-polarized light emitted from the image source 11 toward other than the half-wavelength retarder 12.

The half-wavelength retarder 12 and the prism 9 may be arranged in a front and rear direction.

The prism 9 may be disposed vertically away from the polarization reflection mirror 4.

The prism 9 may emit a light in a direction in which the linearly-polarized light in the first direction is to be away from the linearly-polarized light in the second direction emitted from the half-wavelength retarder 12.

The prism 9 may have a light emitting face 92 inclined in a direction opposite to the front face 41 of the polarization reflection mirror 4.

The linearly-polarized light in the first direction emitted from the image source 11 may be transmitted through the prism 9 and then deflected in the direction to be away from the linearly polarized light in the second direction emitted from the half-wavelength retarder 12. Then the deflected linearly-polarized light in the first direction may be incident on the polarization reflection mirror 4 and transmitted through the polarization reflection mirror 4.

The linearly-polarized light of the first direction transmitted through the polarization reflection mirror 4 may be reflected by the second reflection mirror 5, transmitted through the polarization reflection mirror 4, and then reflected to the windshield 6 by the first reflection mirror 3.

In this case, a second virtual image M' formed by a long-range optical path may be inclined at a predetermined angle compared to a case in which the prism 9 is not included.

FIG. 11 is a side view in which a first virtual image is formed to be inclined when a polarization reflection mirror of a head up display for a vehicle according to a seventh embodiment of the present disclosure rotates. Further, FIG. 12 is a side view in which a second virtual image is formed to be inclined when a second reflection mirror of a head up display for a vehicle according to a seventh embodiment of the present disclosure rotates.

The present embodiment may further include a first rotating mechanism 60 that rotates one of the polarization reflection mirror 4 and the second reflection mirror 5. The present embodiment may further include a second rotating mechanism 70 that rotates the other of the polarization reflection mirror 4 and the second reflection mirror 5.

When the present embodiment includes only the first rotating mechanism 60 and does not include the second rotating mechanism 70, the head up display for the vehicle may adjust only a slope of a first virtual image K and K' and may not adjust a slope of a second virtual image M and M'. Conversely, when the present embodiment includes only the second rotating mechanism 70 and does not include the first rotating mechanism 60, the head up display for the vehicle may adjust only the slope of the second virtual image M and M' and may not adjust the slope of the first virtual image K and K'.

The present embodiment may include both the first rotating mechanism 60 and the second rotating mechanism 70, in this case, the slope of the first virtual image K and K' may be adjusted by the first rotating mechanism 60 and the slope of the second virtual image M and M' may be adjusted by the second rotating mechanism 70.

Hereinafter, an example in which the present embodiment includes both the first rotating mechanism 60 and the second rotating mechanism 70 will be described for the sake of convenience.

The first rotating mechanism 60 may be a polarization reflection mirror rotating mechanism that is connected to one side of the polarization reflection mirror 4 and rotates the polarization reflection mirror 4.

The first rotating mechanism 60 may include a motor and a rotation axis of the motor may be connected to a rotation center of the polarization reflection mirror 4 to rotate the polarization reflection mirror 4 directly. The first rotating mechanism 60 may include the motor and a power transmitting member connected to the motor and connected to a rotation axis of the polarization reflection mirror 4. The polarization reflection mirror 4 may be rotated via the power transmitting member.

It is preferable that the first rotating mechanism 60 rotates the polarization reflection mirror 4 at an angle at which the polarization reflection mirror 4 is not to be in contact with the second reflection mirror 5 when the polarization reflection mirror 4 rotates.

The first rotating mechanism 60 may rotate the polarization reflection mirror 4 in a clockwise or counterclockwise direction by a predetermined angle. Then, the polarization reflection mirror 4 may be disposed at an angle to the second reflection mirror 5, as shown in FIG. 11 from a state in which the polarization reflection mirror 4 is in parallel with the second reflection mirror 5, as shown in FIG. 1.

During the rotation of the polarization reflection mirror 4, a reflection angle of the polarization reflection mirror 4 varies, and a first virtual image K' formed at a short distance L1 from the windshield 6 may be inclined at a predetermined angle, as shown in FIG. 11.

Conversely, the first rotating mechanism 60 may reversely rotate the polarization reflection mirror 4 to be parallel to the second reflection mirror 5. In this case, as shown in FIG. 1, the first virtual image K located at a long distance from the windshield 6 may be vertical.

The second rotating mechanism 70 may be a second reflection mirror rotating mechanism that is connected to one side of the second reflection mirror 5 to rotate the second reflection mirror 5.

The second rotating mechanism 70 ma include a motor and a rotation axis of the motor may be connected to a rotation center of the second reflection mirror 5 to rotate the second reflection mirror 5 directly. The second rotating mechanism 70 may include the motor and a power transmitting member connected to the motor and connected to a rotation axis of the second reflection mirror 5. Further, the second reflection mirror 5 may be rotated via the power transmitting member.

It is preferable that the second rotating mechanism 70 rotates the second reflection mirror 5 at an angle at which the second reflection mirror 5 is not to be in contact with the polarization reflection mirror 4 when the second reflection mirror 5 rotates.

The second rotating mechanism 70 may rotate the second reflection mirror 5 in a clockwise or counterclockwise direction by a predetermined angle. Then, the second reflection mirror 5 may be disposed at an angle to the polarization reflection mirror 4, as shown in FIG. 12 from a state in which the second reflection mirror 5 is in parallel with the polarization reflection mirror 4, as shown in FIG. 1.

During the rotation of the second reflection mirror 5, a reflection angle of the second reflection mirror 5 varies, and a second virtual image M' formed at a long distance L2 from the windshield 6 may be inclined at a predetermined angle, as shown in FIG. 12.

Conversely, the second rotating mechanism 70 may reversely rotate the second reflection mirror 5 to be parallel to the polarization reflection mirror 4. In this case, as shown in FIG. 1, the second virtual image M located at a long distance from the windshield 6 may be vertical.

FIG. 13 is a side view illustrating main components of a head up display for a vehicle according to an eighth embodiment of the present disclosure. Further, FIG. 14 is an enlarged side view of a linear polarizer, a half-wavelength retarder, and a separating partition illustrated in FIG. 13. Further, FIG. 15 is a side view illustrating an optical path of a head up display for a vehicle according to an eighth embodiment of the present disclosure.

Referring to FIGS. 13 to 15, the imaging mechanism 1 of the present embodiment may further include a separating partition 100 for improving an image quality of the virtual image K and M. Other components and operations other than the separating partition 100 of the present embodiment are the same as or similar to the first embodiment of the present disclosure, and thus the same reference numerals are used and a detailed description of other components and operations will be omitted.

The imaging mechanism 1 of the present embodiment may further include the separating partition 100.

The separating partition 100 may improve an image quality of an image light emitted from the head up display for the vehicle towards the vehicle's windshield 6. In more detail, the separating partition 100 may prevent virtual images K and M respectively formed by the image light from being viewed to be overlapped with each other or interfering with each other and may remove unnecessary peripheral image of each the virtual images K and M.

The separating partition 100 may prevent mutual interference of the linearly-polarized light of the first direction and the linearly-polarized light of the second direction emitted from the imaging mechanism 1.

The separating partition 100 may be disposed between the light emitting face of the image source 11 and one face 41 of the polarization reflection mirror 4. In more detail, the separating partition 100 may be disposed between the light emitting face 14B of the linear polarizer 14 and one face 41 of the polarization reflection mirror 4.

The separating partition 100 may be disposed to be in contact with the light emitting face of the image source 11. In more detail, the separating partition 100 may be disposed to be in contact with the light emitting face 14B of the linear polarizer 14.

The separating partition 100 may have a predetermined vertical level in a direction from the image source 11 to the polarization reflection mirror 4. The separating partition 100 may be disposed above the image source 11.

The separating partition 100 may be disposed to be inclined at a predetermined angle.

The half-wavelength retarder 12 may be located on one side of the separating partition 100. The half-wavelength retarder 12 may be spaced apart from the separating partition 100 or may be in contact with each other.

The half-wavelength retarder 12 and the separating partition 100 may be arranged in a front and rear direction.

The separating partition 100 may divide the light emitting face 14B of the linear polarizer 14 into a first light emitting region U and a second light emitting region V. The first light emitting region U may be a portion of the light emitting face 14B of the linear polarizer 14 located on one side of the separating partition 100 and the second light exit region V may be a portion of the light emitting face 14B of the linear polarizer 14 located on the other side of the separating partition 100.

The half-wavelength retarder 12 may be disposed to face the first light emitting region U of the linear polarizer 14. The half-wavelength retarder 12 may face at least a portion of the first light emitting region U.

The first emitting region U may face the half-wavelength retarder 12 and the separating partition 100. Alternatively, the first emitting region U may face only the half-wavelength retarder 12.

The first emitting region U may not be exposed in an upward direction and may not face one face 41 of the polarization reflection mirror 4.

The second emitting region V may view said one face 41 of the polarization reflection mirror 4 and the separating partition 100. The second emitting region V may only view said one face 41 of the polarization reflection mirror 4.

At least a portion of the linearly-polarized light emitted to the first emitting region U of the linear polarizer 14 may be incident on the half-wavelength retarder 12 and half-wavelength converted. At least a portion of the linearly-polarized light emitted to the second emitting region V of the linear polarizer 14 may not be incident on the half-wavelength retarder 12 and directed to the polarization reflection mirror 4.

A portion of the linearly-polarized light emitted to the first emitting region U may be blocked or reflected by the separating partition 100 and may not be directed to the polarization reflection mirror 4. Further, a portion of the linearly-polarized light emitted to the second emitting region V may be blocked or reflected by the separating partition 100 and may not be directed to the polarization reflection mirror 4.

That is, an unnecessary linearly-polarized light forming a peripheral image of the virtual image out of the linearly-polarized light emitted from the image source 11 may be blocked by the separating partition 100.

The imaging mechanism 1, which is a combination of the image source 11, the half-wavelength retarder 12, and the separating partition 100 may be a kind of a heterogeneous linearly-polarized light emitter that emits two linearly-polarized lights having different polarization directions through different regions and prevents the two linearly-polarized lights from interfering with each other.

The separating partition 100 may include a first partition 110 and a second partition 120.

The first partition 110 and the second partition 120 may be formed of a plate member, respectively.

The first partition 110 and the second partition 120 may be integrally formed with each other or may be formed separately from each other.

Lengths or vertical levels of the first partition 110 and the second partition 120 may be different from each other or may be the same.

The half-wavelength retarder 12 may be located on the opposite side of the second partition 120 around the first partition 110.

The first partition 110 and the second partition 120 may be arranged at a certain angle θ3.

Each of the partitions 110 and 120 may be disposed at a predetermined angle with the light emitting face of the image source 11. The light emitting face of the image source 11 may refer to the light emitting face 14B of the linear polarizer 14.

Angles between the light emitting face of the image source 11 and respective partitions 110 and 120 may be different from each other.

For example, an angle θ1 between the first partition 110 and the light emitting face 14B of the linear polarizer 14 may be smaller than an angle θ2 between the second partition 120 and the light emitting face 14B of the linear polarizer 14. Alternatively, the second partition 120 may be disposed perpendicular to the light emitting face 14B of the linear polarizer 14 and the first partition 110 may be disposed at an acute angle with the light emitting face 14B of the linear polarizer 14.

Since the half-wavelength retarder 12 is located at the first emitting region U, the angle θ1 formed by the first partition 110 and the light emitting face of the image source 11 may be smaller than the angle θ2 formed by the second partition 120 and the light emitting face of the image source 11. Thus, a light, which has not passed through the half-wavelength retarder 12, of the light emitted from the first emitting region U may be blocked by the first partition 110.

The second partition 120 may become more distant from the first partition 110 as the second partition 120 becomes more distant from the light emitting face of the image source 11. In more detail, a distance between the first partition 110 and the second partition 120 may become larger as a distance from the image source 11 increases.

For example, the distance between the partitions 110 and 120 may be minimum at respective ends 112 and 122 on an image source 11 side of the partitions 110 and 120 and may be maximum at the other ends 111 and 121.

The arrangement relationship of the first partition 110 and the second partition 120 may prevent the light emitted from the first light emitting region U and the light emitted from the second light emitting region V from overlapping or interfering with each other and may improve a reliability of the separating partition 100.

The respective ends 111 and 121 far away from the image source 11 of both ends of the respective partitions 110 and 120 may be formed in a sharp manner.

The first partition 110 and the second partition 120 may be spaced apart from each other. However, in order to prevent unnecessary loss of the light emitted from the linear polarizer 14, it is preferable that the first partition 110 and the second partition 120 are disposed in contact with each other. In more detail, the respective ends 112 and 122 on the image source 11 side of the first partition 110 and the second partition 120 may be in contact with each other.

The respective one ends 112 and 122 of the partitions 110 and 120 may be disposed in contact with the light emitting face of the image source 11. In more detail, said one end 112 of the first partition 110 and said one end 122 of the second partition 120 may be in contact with the light emitting face 14B of the linear polarizer 14.

The half-wavelength retarder 12 may be positioned between the both ends 111 and 112 of the first partition 110 in a direction parallel to the light emitting face of the image source 11. For example, the half-wavelength retarder 12 may be positioned between the both ends 111 and 112 of the first partition 110 with respect to the horizontal direction.

In this case, an upper end of the separating partition 100 may be located above the half-wavelength retarder 12. In more detail, the upper end 111 of the first partition 110 may be located above the half-wavelength retarder 12.

Thus, the half-wavelength retarder 12 may block a portion of the light, which wavelength has converted, forming an unnecessary peripheral image.

A top face of the separating partition 100 may be open. In more detail, a space 130 opened to face said one face 41 of the polarization reflection mirror 4 may be defined between the first partition 110 and the second partition 120. The space 130 may serve as a light trap.

When the top face of the separating partition 100 is not opened, a light deviating from a defined optical path or an external light entered an interior of the head up display for the vehicle from the outside out of the light emitted from the imaging mechanism 1 may be reflected from the top face of the separating partition 100, so that there is a concern that the image quality of each virtual image K and M may be reduced or unnecessary virtual image may be formed.

The space 130 between the first partition 110 and the second partition 120 may reflect the external light or the like from the inside to trap the external light or the like. This improves the image quality of the virtual image K and M and prevents the unnecessary virtual image from being viewed by a user.

In order to effectively trap the external light of the head up display, the space 130 between the first partition 110 and the second partition 120 may be defined to face a portion where the external light enters. The external light may be a sunlight entering through windshield 6 and this sunlight may enter from above the first reflection mirror 3. Thus, the separating partition 100 may be disposed such that the space 130 between the first partition 110 and the second partition 120 faces above the first reflection mirror 3.

Alternatively, the separating partition 100 may be disposed such that the space 130 between the first partition 110 and the second partition 120 faces between the first reflection mirror 3 and the polarization reflection mirror 4. In more detail, the separating partition 100 may be disposed such that the space 130 between the first partition 110 and the second partition 120 faces the reflective surface 32 of the first reflective mirror 3 and said one face 41 of the polarization reflective mirror 4.

Further, the first partition 110 and/or the second partition 120 may have a protrusion 113 protruding in an outward direction. In this connection, the outward direction may be a direction towards the opposite side of the space 130 defined between the partitions 110 and 120.

The protrusion 113 may protrude perpendicularly to the respective partitions 110 and 120, but is not limited thereto.

The protrusion 113 may be formed at the end 111 and 121 of both ends of the respective the first partition 110 and/or the second partition 120 far from the image source 11.

The protrusion 113 may serve as a light trap. The protrusion 113 may block a linearly-polarized light forming an unnecessary peripheral image of the virtual image out of the linearly-polarized lights emitted from image source 11.

The protrusion 113 formed on the first partition 110 may protrude toward the first emitting region U. That is, the protrusion 113 formed on the first partition 110 may protrude toward the half-wavelength retarder 12.

Due to a gap between the half-wavelength retarder 12 and the first partition 110, there is a concern that a portion of the linearly-polarized light of the first direction emitted from the first emitting region U of the linear polarizer 14 may be directly directed to the polarization reflection mirror 4 without being converted into the linearly-polarized light of the second direction at the half-wavelength retarder 12. The protrusion 113 may serve to block this linearly-polarized light in the first direction.

Since the half-wavelength retarder 12 is not placed at the second emitting region V, the above-mentioned problem is less likely to occur. Therefore, the second partition 120 may not have a protrusion. However, when a separate optical element is disposed at the second emitting region V, it is preferable that the protrusion is formed at the second partition 120 as well as at the first partition 110.

FIG. 16 is a side view illustrating main components of a head up display for a vehicle according to a ninth embodiment of the present disclosure. Further, FIG. 17 is a side view illustrating an optical path of a head up display for a vehicle according to a ninth embodiment of the present disclosure.

The present embodiment may include an image source 210, the first reflection mirror 3, a second reflection mirror 230, a polarization reflection mirror 240, and a phase retarding mirror 250.

The head up display for the vehicle may emit the image light towards the vehicle's windshield 6. The windshield 6 may be the window that is positioned to face the forward direction of the vehicle. The driver may look at the object in front of the vehicle through the windshield 6. The driver may look at the virtual images K and M in front of the windshield 6 via the head up display.

The head up display for the vehicle may be accommodated in or put on the instrument panel 10 in front of the driver's seat of the vehicle and may irradiate the image light in the upward direction.

The image source 210 may emit the linearly-polarized light in the first direction.

The image source 210 may be positioned above the second reflection mirror 230 and the polarized reflection mirror 240 to be described below and may illuminate the linearly-polarized light in the first direction downward. That is, the light emitting face of the image source 210 may be disposed to face downward direction.

In this connection, the downward direction may include not only the vertical direction but also the lower direction which is inclined at a predetermined angle forwardly or rearwardly.

Thus, a deterioration of a panel resulted from the external light such as the sunlight coming in from an upper side of the head up display for the vehicle may be prevented. Further, a ghost phenomenon in which the external light is reflected on an optical component such as a mirror or the like, so that unnecessary light is observed by the driver may be prevented.

The image source 210 may include a display panel 211 for emitting an image light and a linear polarizer 214 for linearly polarizing the image light emitted from the display panel 211 in the first direction.

The display panel 211 may include a display element 212 and a light source 213 that emits light to the display element 212.

The display panel 211 may emit the image light towards the linear polarizer 214. The display panel 211 may be an image generating unit. The display panel 211 may be a display device that controls an electric signal to generate the image light such as an LCD (liquid crystal display panel), an LED (light emitting diode panel), an OLED (organic light emitting diode) panel, or the like.

The light source 213 may be a backlight unit BLU which may illuminate the light toward the display element 212. The light source 213 may be an LED, an OLED, or the like.

The linear polarizer 214 may pass only the linearly-polarized light in the first direction out of the image light emitted from the display panel 211. A non-polarized light that is not polarized may be emitted from the display panel 211 and the non-polarized light may be polarized in the first direction at the linear polarizer 214.

The linear polarizer 214 may emit a P-wave linearly-polarized light P or an S-wave linearly-polarized light S.

The linear polarizer 214 may be disposed within the display element 212. In this case, the linearly-polarized light polarized by the linear polarizer 214 may be emitted from the display element 212.

The linear polarizer 214 may be disposed outside the display element 212. In this case, the non-polarized light emitted from the display element 212 may be incident on the linear polarizer 214, and the linearly-polarized light in the first direction may be emitted from the linear polarizer 214.

When the linear polarizer 214 is disposed outside the display element 212, one face 214A of the linear polarizer 214 may be disposed facing the display element 212 and the other face 214B of the linear polarizer 214 may be disposed to face the second reflection mirror 230 and the polarization reflection mirror 240.

In the linear polarizer 214, said one face 214A facing the display panel 211 may be a light incidence face on which the light is incident and the other face 214B may be a light emitting face. When the image source 210 includes the linear polarizer 214, the light emitting face 214B of the linear polarizer 214 may be the light emitting face of the image source 210.

The linear polarizer 214 may be disposed to cover the light emitting face of the display element 212.

Since the display panel 211 emits the non-polarized light in the downward direction, the linear polarizer 214 may be disposed below the display panel 211.

A portion of the linearly-polarized light emitted from the linear polarizer 214 may be reflected on one face 231 of the second reflection mirror 230 and directed to the first reflection mirror 3 and remaining portion of the linearly-polarized light may be reflected on said one face 241 of the polarization reflection mirror 240 and directed to the phase retarding mirror 250. This will be described in detail below.

The first reflection mirror 3 may reflect the light to the vehicle's windshield 6. In more detail, the first reflection mirror 3 may reflect the light reflected from the second reflection mirror 230 and the light transmitted through the polarization reflection mirror 240 toward the windshield 6.

The first reflection mirror 3 may be a concave mirror, but is not limited thereto.

The first reflection mirror 3 may be disposed in front of the second reflection mirror 230 and the polarization reflection mirror 240. The reflective face 32 of the first reflective mirror 3 may face the front face 242 of the polarization reflection mirror 240 and may face the reflective face 231 of the second reflection mirror 230.

The first reflection mirror 3 may be disposed to be inclined at a predetermined angle. Further, the light reflected from the polarized reflection mirror 240 or transmitted through the polarization reflection mirror 240 may be reflected upward.

The second reflection mirror 230 may reflect the linearly-polarized light incident from the image source 210. The second reflection mirror 230 may reflect a portion of the linearly-polarized light in the first direction emitted from the image source 210 to the first reflection mirror 3.

The second reflection mirror 230 may be a flat mirror, but is not limited thereto. For example, the second reflection mirror 230 may be a polarization reflection mirror that reflects the linearly-polarized light in the first direction and the linearly-polarized light in the second direction perpendicular to the first direction.

Said one face 231 of the second reflection mirror 230 may face the light emitting face 214B of the linear polarizer 214. Said one face 231 of the second reflection mirror 230 may be a reflective face on which the linearly-polarized light emitted from the linear polarizer 214 is reflected.

The linearly polarized light emitted from the linear polarizer 214 and incident on the second reflection mirror 230 may be reflected on said one face 231 of the second reflection mirror 230 and directed to the first reflection mirror 3.

The second reflection mirror 230 may be positioned below the image source 210.

The second reflection mirror 230 may be disposed behind the first reflection mirror 3 and may be spaced apart from the first reflection mirror 3.

The second reflection mirror 230 may face some regions of the linear polarizer 214. In more detail, the reflective face 231 of the second reflection mirror 230 may face some regions of the light emitting face 214B of the linear polarizer 214.

The second reflection mirror 230 may face only some regions of the light emitting face 214B of the linear polarizer 214 and preferably not to face other regions of the light emitting face 214B of the linear polarizer 214.

The second reflection mirror 230 may not be disposed in line with the linear polarizer 214 but may be disposed at a predetermined angle with the linear polarizer 214. That is, the second reflection mirror 230 and the linear polarizer 214 may be arranged at an angle to each other.

The second reflection mirror 230 may be inclined such that the reflective face 231 faces a forward and upward direction. The reflective face 231 of the second reflection mirror 230 may be disposed to face the first reflection mirror 3.

The polarization reflection mirror 240 may be a beam splitter that reflects a linearly-polarized light in the same direction as the linearly-polarized light emitted from the image source 210 and transmit a linearly-polarized light in a direction orthogonal to the linearly-polarized light emitted from the image source 210.

The polarization reflection mirror 240 may be formed in a plate shape. Said one face 241 and the other face 242 of the polarization reflection mirror 4 may respectively refer to a pair of relatively wide faces facing each other of an outer face of the polarization reflection mirror 240.

Said one face 241 of the polarization reflection mirror 240 may be a rear face disposed to face a rearward direction. Further, the other face 241 may be a front face disposed to face a forward direction.

The linearly-polarized light of the first direction emitted from the linear polarizer 214 may be reflected from said one face 241 of the polarization reflection mirror 240 and directed to the phase retarding mirror 250. The linearly-polarized light in the second direction reflected from the phase retarding mirror 250 may be incident on said one face 241 of the polarization reflection mirror 240 and transmitted through the other face 242.

The polarization reflection mirror 240 may be disposed behind the first reflection mirror 3 and may be spaced apart from the first reflection mirror 3.

The polarization reflection mirror 240 may not be disposed in line with the linear polarizer 214 but may be disposed at a predetermined angle with the linear polarizer 214. That is, the polarization reflection mirror 240 and the linear polarizer 214 may be arranged at an angle to each other.

The polarization reflection mirror 240 may be a selective polarization element that reflects the linearly-polarized light in the first direction and transmits the linearly-polarized light in the second direction. The polarization reflection mirror 240 may preferably be a wire grid polarizer (WGP) disposed behind the first reflection mirror 3. The wire grid polarizer reflects a linearly-polarized light in a direction perpendicular to a polarization transmission axis thereof and transmits a linearly-polarized light in a direction matches the polarization transmission axis thereof.

The polarization reflection mirror 240, the wire grid polarizer, may maintain its selective transmission/reflection performance while receiving, at a wide incident angle, lights respectively incident from the image source 210 and the phase retarding mirror 250.

When the linearly-polarized light of the first direction is the P-wave linearly-polarized light P, the polarization reflection mirror 240 may reflect the P-wave linearly-polarized light P and transmit the S-wave linearly-polarized light S. Conversely, when the linearly-polarized light of the first direction is the S-wave linearly-polarized light, the polarization reflection mirror 240 may reflect the S-wave linearly-polarized light S and transmit the P-wave linearly-polarized light.

The polarization reflection mirror 240 may be located below the image source 210.

The polarization reflection mirror 240 may face some regions of the linear polarizer 214. In more detail, the rear face 241 of the polarization reflection mirror 240 may face some regions of the light emitting face 214B of the linear polarizer 214.

The polarization reflection mirror 240 may be a wire grid polarizer that reflects the linearly-polarized light of the first direction emitted from the image source 210 and transmits the linearly-polarized light of the second direction reflected from the phase retarding mirror 250 and directed to the first reflection mirror 3.

The linearly-polarized light of the first direction reflected from the polarization reflection mirror 240 may be incident on the phase retarding mirror 250, wavelength converted by the phase retarding mirror 250, and reflected toward the polarization reflection mirror 240.

The linearly-polarized light of the second direction reflected from the phase retarding mirror 250 toward the rear face 241 of the polarization reflection mirror 240 may be transmitted through the polarization reflection mirror 240 and directed to the first reflection mirror 3 through the front face 242 of the polarization reflection mirror 240.

The polarization reflection mirror 240, which is the selective polarization element, may lower a brightness of the image source 210 because the loss of light is less than that of a half mirror. Further, the polarization reflection mirror 240 may reduce a power consumption of the image source 210 and may reduce a size of a heat dissipating unit (not shown) that dissipates heat of the image source 210 or may simplify a structure of the heat dissipating unit.

For rear reflection of the linearly-polarized light in the first direction and front transmission of the linearly-polarized light in the second direction, the polarization reflection mirror 240 may be disposed between the first reflection mirror 3 and the phase retarding mirror 250, and may be disposed to be inclined between the first reflection mirror 3 and the phase retarding mirror 250.

The polarization reflection mirror 240 may be disposed behind the first reflection mirror 3 and disposed in front of the phase retarding mirror 250.

Because the polarization reflection mirror 240 selectively transmits/reflects the linearly-polarized light between the first reflection mirrors 3 and the phase retarding mirror 5, the head up display for the vehicle according to the present embodiment of the present disclosure may minimize the number of multiple optical components to form the two virtual images and may compact the overall size of the head up display for the vehicle.

The polarization reflection mirror 240 may be inclined such that the front face 242 thereof faces a forward and downward direction. The polarization reflection mirror 240 may have the rear face 241 thereof facing a rearward and upward direction and the rear face 241 of the polarization reflection mirror 240 may face a front face of the phase retarding mirror 250. In this connection, the front face of the phase retarding mirror 250 may refer to a front face 252A of a quarter-wavelength retarder 252.

The linear polarizer 214 may have a first region Q facing said one face 231 of the second reflection mirror 230 and a second region R facing said one face 241 of the polarization reflection mirror 240.

An angle between the first region Q and said one face 231 of the second reflection mirror 230 may be an acute angle. Further, an angle between the second region R and said one face 241 of the polarization reflection mirror 240 may be an acute angle.

A linearly-polarized light of the first direction emitted from the first region Q of the linear polarizer 214 may be incident on the second reflection mirror 230 and reflected from the second reflection mirror 230 toward the first reflection mirror 3.

On the other hand, a linearly-polarized light of the first direction emitted from the second region R of the linear polarizer 214 may be incident on the polarization reflection mirror 240 and reflected from the polarization reflection mirror 240 to the phase retarding mirror 250.

That is, the second reflection mirror 230 and the polarization reflection mirror 240 may be arranged to face different regions of the linear polarizer 214, respectively.

The second reflection mirror 230 and/or the polarization reflection mirror 240 may be disposed to be in contact with the light emitting face 214B of the linear polarizer 214.

Further, the second reflection mirror 230 and the polarization reflection mirror 240 may be arranged to be in contact with each other. In more detail, respective ends of the second reflection mirror 230 and the polarization reflection mirror 240 on a side of the image source 210 may be in contact with each other.

Accordingly, the linearly-polarized light emitted from the image source 210 may be split and the split lights may be respectively incident on the second reflection mirror 230 and the polarization reflection mirror 240. That is, as described above, a portion of the linearly-polarized light emitted from the linear polarizer 214 is incident on the second reflection mirror 230 and a remaining portion may be incident on the polarization reflection mirror 240.

The angle θ between the second reflection mirror 230 and the polarization reflection mirror 240 may be 90° or above. That is, the angle θ between the second reflection mirror 230 and the polarization reflection mirror 240 may be a right angle or an obtuse angle. A spacing between the second reflection mirror 230 and the polarization reflection mirror 240 may increase as a distance from the image source 210 increases.

Because of the above mentioned configuration, an angle between the linearly-polarized lights of the first direction emitted from the image source 210 and respectively reflected from the second reflection mirror 230 and the polarization reflection mirror 240 may be 90° or above.

The second reflection mirror 230 may reflect the linearly-polarized light incident from the image source 210 in a forward direction and the polarization reflection mirror 240 may reflect the linearly-polarized light incident from the image source 210 in a rearward direction.

This allows a path difference between the short-range optical path L1 and the long-range optical path L2 respectively formed by the linearly-polarized light to be large such that a spacing between the two virtual images K and M may be sufficiently secured.

The phase retarding mirror 250 may convert the linearly-polarized light of the first direction reflected from the polarization reflection mirror 240 into the linearly-polarized light of the second direction and reflect the linearly-polarized light of the second direction to the polarization reflection mirror 240.

The phase retarding mirror 250 may be spaced apart from the polarization reflection mirror 240 and may be disposed behind the polarization reflection mirror 240. The front face of the phase retarding mirror 250 may be disposed to face the rear face 241 of the polarization reflection mirror 240.

The phase retarding mirror 250 may be disposed to be closer to the polarization reflection mirror 240 downwardly.

The phase retarding mirror 250 may include a mirror 251 and a quarter-wavelength retarder 252 disposed between the mirror 251 and the polarizing mirror 240.

The mirror 251 may be a reflection mirror that reflects incident light. The mirror 251 may include a transparent plate 254 and a reflective layer 255 formed on a rear face of the transparent plate 254.

The quarter-wavelength retarder 252 is an optical element that converts a polarization state of light transmitted through the quarter-wavelength retarder 252. The quarter-wavelength retarder 252 may be a quarter-wavelength plate.

The one face 252A and the other face 252B of the quarter-wavelength retarder 252 may respectively refer to a pair of relatively wide faces facing each other of an outer face of the quarter-wavelength retarder 252.

Said one-face 252A of the quarter-wavelength retarder 252 may be a front face directed to a forward direction and the other face 252B may be a rear face directed to a rearward direction.

The quarter-wavelength retarder 252 may be a circular polarizer. The quarter-wavelength retarder 252 may retard a phase of the linearly-polarized light emitted from the polarization reflection mirror 240 and incident on the quarter-wavelength retarder 252 by quarter-wavelength and may retard a phase of the linearly-polarized light reflected from the mirror 251 by quarter-wavelength.

The phase retarding mirror 250 may be disposed such that the quarter-wavelength retarder 252 faces the polarization reflection mirror 240.

In the phase retarding mirror 250, a distance between the mirror 251 and the quarter-wavelength retarder 252 is preferably as close as possible. The mirror 251 and the quarter-wavelength retarder 252 are preferably integrated.

The quarter-wavelength retarder 252 may be attached to a face of both faces of the mirror 251 facing the polarization reflection mirror 240.

The mirror 251 may be a flat mirror and the quarter-wavelength retarder 252 may be attached to the flat mirror with an adhesive 253.

The quarter-wavelength retarder 252 may be attached to a front face of the mirror 251 with the adhesive 253. The rear face 252B of the quarter-wavelength retarder 252 may be attached to a front face of the transparent plate 254 with the adhesive 253, in particular a transparent adhesive.

The quarter-wavelength retarder 252 may convert the linearly-polarized light of the first direction incident on the polarization reflection mirror 240 by a quarter-wavelength into circularly-polarized light.

The mirror 251 may reflect the circularly-polarized light incident from the quarter-wavelength retarder 252 to the quarter-wavelength retarder 252.

The quarter-wavelength retarder 252 may convert the circularly-polarized light reflected from the mirror 251 by a quarter-wavelength. A linearly-polarized light in the second direction may be emitted from the quarter-wavelength retarder 252 toward the polarization reflection mirror 240.

The head-up display for the vehicle of the present disclosure as described above may form a first virtual image K at a first location relatively close to the windshield 6 and a second virtual image at a second location relatively farther away from the windshield 6.

The first virtual image K and the second virtual image M may provide different kinds of information to the driver. For example, the first virtual image K may represent driving information such as a vehicle speed or the like and the second virtual image M may be used to implement an augmented reality (AR) in which the second virtual image M is viewed overlapping with external environment such as another vehicle ahead of the vehicle, a road, or the like.

The first virtual image K may be formed by the short-range optical path L1 from the image source 210, through the second reflection mirror 230 and the first reflection mirror 3, to the windshield 6.

Further, the second virtual image M may be formed by the long-range optical path L2 from the image source 210, through the polarization reflection mirror 240, the phase retarding mirror 250, the polarization reflection mirror 240, and the first reflection mirror 3, to the windshield 6.

In more detail, the short-range optical path L1 may include a first path T1 along which the linearly-polarized light of the first direction emitted from the image source 210 is incident on the second reflection mirror 230, a second path T2 along which the linearly-polarized light of the first direction reflected from the second reflection mirror 230 is incident on the first reflection mirror 3, and a third path T3 along which the linearly-polarized light of the first direction reflected from the first reflection mirror 3 is incident on the windshield 6.

On the other hand, the long-range optical path L2 may include a fourth path along which the linearly-polarized light of the first direction emitted from the image source 210 is incident on the polarization reflection mirror 240, a fifth path T5 along which the linearly-polarized light of the first direction reflected from the polarization reflection mirror 240 is incident on the phase retarding mirror 250, a sixth path T6 along which the linearly-polarized light of the second direction reflected from the phase retarding mirror 250 is incident on the polarization reflection mirror 240, a seventh path T7 along which the linearly-polarized light of the second direction transmitted from the polarization reflection mirror 240 is incident on the first reflection mirror 3, an eighth path T8 along which the linearly-polarized light of the second direction reflected from the first reflection mirror 3 is incident on the windshield 6.

Hereinafter, an operation of the present embodiment will be described.

For convenience of description, an example in which the P-wave linearly-polarized light P is emitted from the image source 210 will be described.

A portion of the P-wave linearly-polarized light P emitted from the image source 210 may be reflected from the second reflection mirror 230 to the first reflection mirror 3 and the remaining portion may be reflected from the polarization reflection mirror 240 to the phase retarding mirror 250.

The P-wave linearly-polarized light P reflected to the first reflection mirror 3 may be reflected by the first reflection mirror 3 to the windshield 6.

On the other hand, the P-wave linearly-polarized light P reflected to the phase retarding mirror 250 may be wavelength converted by the phase retarding mirror 250 into the S-wave linearly-polarized light S and reflected to the polarization reflection mirror 240. Then, the S-wave linearly-polarized light S may be transmitted through the polarization reflection mirror 240 and directed to the first reflection mirror 3.

The driver may recognize the first virtual image K formed by the short-range optical path L1 and the second virtual image M formed by the long-range optical path L2 through windshield 6.

The head up display for the vehicle may form the two virtual images K and M with different distances from the windshield 6. As such, the two virtual images K and M having different distances may be recognized by an eye J of the driver boarding the vehicle.

Further, an example in which the S-wave linearly-polarized light S is emitted from the image source 210 differs from the example in which the P-wave linearly-polarized light P is emitted from the image source 210 only in a type of the linearly-polarized light and operations in both examples are the same. Therefore, a detailed description of the operations will be omitted in order to avoid redundant descriptions.

FIG. 18 is a side view illustrating main components of a head up display for a vehicle according to a tenth embodiment of the present disclosure. Further, FIG. 19 is a side view illustrating an optical path of a head up display for a vehicle according to a tenth embodiment of the present disclosure.

Except for a vertical position relationship of the image source 210, the second reflection mirror 230, the polarization reflection mirror 240, and the phase retarding mirror 250, the head up display for the vehicle according to the present embodiment is the same as that of the ninth embodiment as described above. Therefore, overlapping contents described above will be omitted and differences will be mainly described below.

The image source 210 of the present embodiment may be located below the second reflection mirror 230 and the polarization reflection mirror 240 and may irradiate the linearly-polarized light of the first direction in the upward direction. In this connection, the upward direction may include not only the vertical direction but also the upper direction inclined at a predetermined angle forwardly or rearwardly.

The light emitting face of the image source 210 may be disposed to face the upward direction.

Since the display panel 211 emits the non-polarized light in the upward direction, the linear polarizer 214 may be disposed above the display panel 211.

The second reflection mirror 230 and the polarization reflection mirror 240 may be positioned above the image source 210.

The second reflection mirror 230 may be inclined such that the reflective face 231 faces the forward and downward direction.

The polarization reflection mirror 240 may be inclined such that the front face 242 thereof faces the forward and upward direction. The polarization reflection mirror 240 may have the rear face 241 thereof facing the rearward and downward direction.

The phase retarding mirror 250 may be disposed in a direction to be closer to the polarization reflection mirror 240 upwardly.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments.

The scope of the present disclosure should be construed as being covered by the scope of the appended claims, and all technical ideas falling within the scope of the claims should be construed as being included in the scope of the present disclosure.

What is claimed is:

1. A head up display for a vehicle comprising: an imaging mechanism for emitting a linearly-polarized light in a first direction and a linearly-polarized light in a second direction orthogonal to the first direction; a first reflection mirror for reflecting a light to a windshield of the vehicle; a polarization reflection mirror spaced apart from the first reflection mirror wherein the polarization reflection mirror transmits the linearly-polarized light in the first direction and reflects the linearly-polarized light in the second direction; and a second reflection mirror spaced apart from the polarization reflection mirror wherein the second reflection mirror reflects the light transmitted through the polarization reflection mirror to the polarization reflection mirror, wherein the imaging mechanism includes a separating partition for preventing mutual interference between the linearly-polarized light in the first direction and the linearly-polarized light in the second direction; an image source for emitting the linearly-polarized light in the first direction; and a half-wavelength retarder for half-wavelength converting a portion of the linearly- polarized light in the first direction emitted from the image source into the linearly-polarized light in the second direction.

2. The head up display for the vehicle of claim 1, wherein the separating partition is disposed to be in contact with a light emitting face of the image source.

3. The head up display for the vehicle of claim 1, wherein the image source includes: a display panel for emitting an image light; and a linear polarizer for linearly polarizing the image light emitted from the display panel in the first direction, wherein the separating partition divides the light emitting face of the linear polarizer into a first emitting region and a second emitting region, and wherein the half-wavelength retarder faces the first emitting region.

4. The head up display for the vehicle of claim 3, wherein the first emitting region faces the half-wavelength retarder, and
wherein the second emitting region faces one face of the polarization reflection mirror.

5. The head up display for the vehicle of claim 1, wherein the separating partition includes: a first partition having a predetermined angle with a light emitting face of the image source; and a second partition disposed to be more distant from the first partition as the second partition becomes more distant from the light emitting face of the image source.

6. The head up display for the vehicle of claim 5, wherein a space opened to face between the first reflection mirror and the polarization reflection mirror is defined between the first partition and the second partition.

7. The head up display for the vehicle of claim 5, wherein the half-wavelength retarder is located on an opposite side of the second partition around the first partition.

8. The head up display for the vehicle of claim 7, wherein a protrusion protruding toward the half-wavelength retarder side is formed on the first partition, and wherein the protrusion is formed at an end of both ends of the first partition far from the image source.

9. The head up display for the vehicle of claim 7, wherein an angle between the first partition and the light emitting face of the image source is smaller than an angle between the second partition and the light emitting face of the image source.

10. The head up display for the vehicle of claim 7, wherein an upper end of the first partition is located above the half-wavelength retarder.

11. The head up display for the vehicle of claim 1, wherein the half-wavelength retarder and the separating partition are disposed between the light emitting face of the image source and one face of the polarization reflection mirror.

\* \* \* \* \*